(12) United States Patent
Tabata (10) Patent No.: US 12,215,411 B2
(45) Date of Patent: *Feb. 4, 2025

(54) COATED STEEL MEMBER, COATED STEEL SHEET, AND METHODS FOR PRODUCING SAME

(71) Applicant: NIPPON STEEL CORPORATION, Tokyo (JP)

(72) Inventor: Shinichiro Tabata, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/348,163

(22) Filed: Jul. 6, 2023

(65) Prior Publication Data

US 2023/0349030 A1 Nov. 2, 2023

Related U.S. Application Data

(62) Division of application No. 17/776,184, filed as application No. PCT/JP2020/043344 on Nov. 20, 2020, now Pat. No. 11,827,964.

(30) Foreign Application Priority Data

Nov. 22, 2019 (JP) ................... 2019-211299

(51) Int. Cl.
*C22C 38/54* (2006.01)
*C21D 8/02* (2006.01)
(Continued)

(52) U.S. Cl.
CPC ............ *C22C 38/54* (2013.01); *C21D 8/0205* (2013.01); *C21D 8/0226* (2013.01);
(Continued)

(58) Field of Classification Search
CPC .......... B32B 15/012; C21D 1/18; C21D 1/26; C21D 1/76; C21D 2211/008;
(Continued)

(56) References Cited

U.S. PATENT DOCUMENTS 11,427,882 B2 * 8/2022 Tabata ..................... C23C 2/02
11,618,933 B2 4/2023 Tabata
(Continued)

FOREIGN PATENT DOCUMENTS

CN 108699647 A 10/2018
JP 2002-102980 A 4/2002
(Continued)

OTHER PUBLICATIONS

Final Office Action mailed May 23, 2023 in copending U.S. Appl. No. 17/776,184.
(Continued)

*Primary Examiner* — Jie Yang
(74) *Attorney, Agent, or Firm* — Birch, Stewart, Kolasch & Birch, LLP (57) ABSTRACT

A coated steel member includes: a steel sheet substrate containing, as a chemical composition, by mass %, C: 0.25% to 0.65%, Si: 0.10% to 1.00%, Mn: 0.30% to 1.00%, P: 0.050% or less, S: 0.0100% or less, N: 0.010% or less, Ti: 0.010% to 0.100%, B: 0.0005% to 0.0100%, Nb: 0.02% to 0.10%, Mo: 0.10% to 1.00%, Cu: 0.15% to 1.00%, and Ni: 0.05% to 0.25%; and a coating formed on a surface of the steel sheet substrate and containing Al and Fe. The maximum Cu content in a range from the surface to a depth of 5.0 μm is 150% or more of the Cu content of the steel sheet substrate.

3 Claims, 1 Drawing Sheet

(51) Int. Cl.
  *C21D 9/46*   (2006.01)
  *C22C 38/00*  (2006.01)
  *C22C 38/02*  (2006.01)
  *C22C 38/04*  (2006.01)
  *C22C 38/06*  (2006.01)
  *C22C 38/42*  (2006.01)
  *C22C 38/44*  (2006.01)
  *C22C 38/46*  (2006.01)
  *C22C 38/48*  (2006.01)
  *C22C 38/50*  (2006.01)
  *C23C 2/12*   (2006.01)
  *C23C 2/26*   (2006.01)
  *C23C 2/28*   (2006.01)
  *C23C 2/40*   (2006.01)

(52) U.S. Cl.
  CPC ............. *C21D 8/0236* (2013.01); *C21D 9/46* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C23C 2/12* (2013.01); *C23C 2/26* (2013.01); *C23C 2/28* (2013.01); *C23C 2/29* (2022.08); *C23C 2/40* (2013.01)

(58) Field of Classification Search
  CPC .. C21D 8/0205; C21D 8/0226; C21D 8/0236; C21D 8/0247; C21D 8/0257; C21D 8/0278; C21D 9/46; C23C 10/02; C23C 10/28; C23C 2/02; C23C 2/12; C23C 2/26; C23C 2/28; C23C 2/29; C23C 2/40; C23C 28/02; C23C 28/021; C23C 28/023; C22C 38/02; C22C 38/04; C22C 38/06; C22C 38/08; C22C 38/16
  See application file for complete search history.

(56) References Cited

U.S. PATENT DOCUMENTS

| | | | |
|---|---|---|---|
| 11,827,964 B2 * | 11/2023 | Tabata | .................. B32B 15/012 |
| 2016/0312331 A1 | 10/2016 | Cho et al. | |
| 2017/0081741 A1 | 3/2017 | Tabata et al. | |
| 2017/0081742 A1 | 3/2017 | Tabata et al. | |
| 2019/0003029 A1 | 1/2019 | Oh et al. | |
| 2020/0071784 A1 | 3/2020 | Yoshioka et al. | |
| 2021/0164080 A1 | 6/2021 | Fujita et al. | |
| 2021/0356560 A1 | 11/2021 | Tabata | |

FOREIGN PATENT DOCUMENTS

| | | |
|---|---|---|
| JP | 2005-97725 A | 4/2005 |
| JP | 2008-266721 A | 11/2008 |
| JP | 2012-1802 A | 1/2012 |
| JP | 2012-41597 A | 3/2012 |
| JP | 2012-180594 A | 9/2012 |
| JP | 2017-508069 A | 3/2017 |
| JP | 2019-506523 A | 3/2019 |
| WO | WO 2015/182591 A1 | 12/2015 |
| WO | WO 2015/182596 A1 | 12/2015 |
| WO | WO 2019/111931 A1 | 6/2019 |
| WO | WO 2020/162513 A1 | 8/2020 |

OTHER PUBLICATIONS

Non-Final Office Action mailed Feb. 8, 2023 in copending U.S. Appl. No. 17/776,184.
Restriction Requirement mailed Dec. 27, 2022 in copending U.S. Appl. No. 17/776,184.

* cited by examiner

COATED STEEL MEMBER, COATED STEEL SHEET, AND METHODS FOR PRODUCING SAME

CROSS-REFERENCE TO RELATED APPLICATIONS

This application is a Divisional of copending application Ser. No. 17/776,184 filed on May 11, 2022, which is the U.S. National Phase of PCT/JP2020/043344, filed Nov. 20, 2020, and which claims priority under 35 U.S.C. § 119(a) to Application No. 2019-211299 filed in Japan, on Nov. 22, 2019, the entire contents of all of which are expressly incorporated by reference into the present application

TECHNICAL FIELD OF THE INVENTION

The present invention relates to a coated steel member, a coated steel sheet, and methods for producing the same.

BACKGROUND ART

In the automotive field, in order to improve both fuel consumption and collision safety against the background of recent stringent environmental regulations and collision safety standards, the application of a steel sheet having high tensile strength (high-strength steel sheet) has expanded. However, the press formability of the steel sheet decreases as the strength becomes high, thereby making it difficult to produce the steel sheet into a product having a complex shape.

Specifically, the ductility of the steel sheet decreases with high-strengthening, and the steel sheet is fractured at a highly processed portion when the steel sheet is processed into a complex shape, which is a problem. Furthermore, with the high-strengthening of the steel sheet, the residual stress after processing causes springback and wall warpage, and the dimensional accuracy deteriorates, which is a problem. Therefore, it is not easy to press-form a steel sheet having high strength, particularly a tensile strength of 780 MPa or more, into a product having a complex shape. Roll forming makes it easier to process a high-strength steel sheet than press forming, but is limited to being applied to components each having a uniform cross section in a longitudinal direction.

Therefore, in recent years, for example, as disclosed in Patent Documents 1 to 3, a hot stamping technique has been adopted as a technique of press-forming a material that is difficult to form, for example, a high-strength steel sheet. The hot stamping technique is a hot forming technique of heating a material provided for forming and then of forming the material.

In this technique, the material is heated and then formed. Therefore, during forming, the steel is soft and has good formability. Accordingly, even a steel sheet having high strength can be accurately formed into a complex shape. Furthermore, in the hot stamping technique, since hardening is performed simultaneously with forming by a press die, a steel member after forming has sufficient strength.

For example, Patent Document 1 discloses that a steel member having a tensile strength of 1,400 MPa or more after forming can be obtained by the hot stamping technique.

In recent years, countries around the world have set higher CO2 reduction targets, and each vehicle manufacturer has progressed in reducing fuel consumption in consideration of collision safety. Not only gasoline vehicles but also electric vehicles that are under rapid progress require high-strength materials that protect not only passengers but also batteries from collision and that cancel out the amount of an increase in weight. For example, regarding a steel member, a hot stamping member that has a higher strength, specifically, a strength of more than 1.5 GPa and that is commonly used is required as a steel member formed by hot stamping at present.

However, most of metal materials deteriorate in various properties with high-strengthening and particularly, the hydrogen embrittlement susceptibility increases. It is known that the hydrogen embrittlement susceptibility increases when the tensile strength of a steel member is 1.2 GPa or more, and there is a case of hydrogen embrittlement cracking in bolt steel of which high-strengthening has progressed ahead of the automotive field. In the hot stamping member having a strength of more than 1.5 GPa, the hydrogen embrittlement susceptibility further increases, which is a concern.

The most popular steel sheet for hot stamping is a coated steel sheet (aluminum-plated steel sheet) of which the surface is subjected to aluminum plating. However, since the aluminum-plated steel sheet absorbs hydrogen when the hot stamp is heated, there is a risk that hydrogen embrittlement cracking occurs after the aluminum-plated steel sheet is assembled to a vehicle body after hot stamping in a region having a strength of more than 1.5 GPa in which the hydrogen embrittlement susceptibility increases. Therefore, in order to apply the hot stamping member having a strength of more than 1.5 GPa to the vehicle body for a further reduction in the weight of the vehicle body, a risk of hydrogen embrittlement cracking needs to be sufficiently reduced.

Regarding a high-strength steel having a tensile strength of more than 1.5 GPa, for example, Patent Document 2 discloses a press-formed article that has excellent toughness and a tensile strength of 1.8 GPa or more and that is hot press-formed. Patent Document 3 discloses a steel having a tensile strength as extremely high as 2.0 GPa or more and further having good toughness and ductility. Patent Document 4 discloses a steel having a tensile strength as high as 1.8 GPa or more and further having good toughness. Patent Document 5 discloses a steel having a tensile strength as extremely high as 2.0 GPa or more and further having good toughness.

However, in Patent Documents 2 to 5, regarding hydrogen embrittlement resistance, when an aluminum-plated steel sheet is used, sufficient countermeasures against the absorption of hydrogen are not taken, and when a high-strength steel having a tensile strength of more than 1.5 GPa is used as a vehicle member, higher safety requirements may not be sufficiently met.

Furthermore, regarding a high-strength steel having excellent hydrogen embrittlement resistance and using an aluminum-plated steel sheet, for example, Patent Document 6 discloses a method in which a heating atmosphere of the steel sheet is set to an atmosphere having a dew point of 30° C. or lower to limit the amount of hydrogen invading the steel, and in which the residual stress after post-processing is reduced to suppress hydrogen embrittlement after hot stamping.

However, in Patent Document 6, sufficient countermeasures against hydrogen embrittlement of the high-strength steel having a strength of more than 1.5 GPa are not taken, and in the application of the high-strength steel having a tensile strength of more than 1.5 GPa to vehicle members, higher safety requirements may not be met.

PRIOR ART DOCUMENT

Patent Document

[Patent Document 1] Japanese Unexamined Patent Application, First Publication No. 2002-102980
[Patent Document 2] Japanese Unexamined Patent Application, First Publication No. 2012-180594
[Patent Document 3] Japanese Unexamined Patent Application, First Publication No. 2012-1802
[Patent Document 4] PCT International Publication No. WO2015/182596
[Patent Document 5] PCT International Publication No. WO2015/182591
[Patent Document 6] Japanese Unexamined Patent Application, First Publication No. 2008-266721

DISCLOSURE OF THE INVENTION

Problems to be Solved by the Invention

The present invention is conceived to solve the above problems, and an object of the present invention is to provide a coated steel member having high tensile strength and excellent hydrogen embrittlement resistance, a coated steel sheet suitable as a material of the steel member, and methods for producing the same.

Means for Solving the Problem

The concept of the present invention is a coated steel member, a coated steel sheet, and methods for producing the same as follows. Hereinafter, a steel sheet of which the surface is not subjected to a coating and which is a material of a coated steel sheet is simply referred to as a "steel sheet".

(1) A coated steel member includes: a steel sheet substrate containing, as a chemical composition, by mass %, C: 0.25% to 0.65%, Si: 0.10% to 1.00%, Mn: 0.30% to 1.00%, P: 0.050% or less, S: 0.0100% or less, N: 0.010% or less, Ti: 0.010% to 0.100%, B: 0.0005% to 0.0100%, Nb: 0.02% to 0.10%, Mo: 0.10% to 1.00%, Cu: 0.15% to 1.00%, Ni: 0.05% to 0.25%, Cr: 0% to 1.00%, V: 0% to 1.00%, Ca: 0% to 0.010%, Al: 0% to 1.00%, Sn: 0% to 1.00%, W: 0% to 1.00%, Sb: 0% to 1.00%, Zr: 0% to 1.00%, REM: 0% to 0.30%, and a remainder consisting of Fe and impurities; and a coating formed on a surface of the steel sheet substrate and containing Al and Fe. The maximum Cu content in a range from the surface to a depth of 5.0 µm is 150% or more of a Cu content of the steel sheet substrate.

(2) A coated steel sheet includes: a steel sheet containing, as a chemical composition, by mass %, C: 0.25% to 0.65%, Si: 0.10% to 1.00%, Mn: 0.30% to 1.00%, P: 0.050% or less, S: 0.0100% or less, N: 0.010% or less, Ti: 0.010% to 0.100%, B: 0.0005% to 0.0100%, Nb: 0.02% to 0.10%, Mo: 0.10% to 1.00%, Cu: 0.15% to 1.00%, Ni: 0.05% to 0.25%, Cr: 0% to 1.00%, V: 0% to 1.00%, Ca: 0% to 0.010%, Al: 0% to 1.00%, Sn: 0% to 1.00%, W: 0% to 1.00%, Sb: 0% to 1.00%, Zr: 0% to 1.00%, REM: 0% to 0.30%, and a remainder consisting of Fe and impurities; a coating on a surface of the steel sheet and containing Al; and a boundary portion formed between the steel sheet and the coating. The maximum Cu content of the boundary portion is 80% or more of the average Cu content of the steel sheet.

(3) A method for producing a coated steel sheet, includes: melting and casting a steel containing, as a chemical composition, by mass %, C: 0.25% to 0.65%, Si: 0.10% to 1.00%, Mn: 0.30% to 1.00%, P: 0.050% or less, S: 0.0100% or less, N: 0.010% or less, Ti: 0.010% to 0.100%, B: 0.0005% to 0.0100%, Nb: 0.02% to 0.10%, Mo: 0.10% to 1.00%, Cu: 0.15% to 1.00%, Ni: 0.05% to 0.25%, Cr: 0% to 1.00%, V: 0% to 1.00%, Ca: 0% to 0.010%, Al: 0% to 1.00%, Sn: 0% to 1.00%, W: 0% to 1.00%, Sb: 0% to 1.00%, Zr: 0% to 1.00%, REM: 0% to 0.30%, and a remainder consisting of Fe and impurities, to obtain a slab; hot-rolling the slab into a hot-rolled steel sheet; coiling the hot-rolled steel sheet; as necessary, annealing the hot-rolled steel sheet; as necessary, descaling the hot-rolled steel sheet and cold-rolling the hot-rolled steel sheet into a cold-rolled steel sheet; as necessary, annealing the hot-rolled steel sheet or the cold-rolled steel sheet into an annealed steel sheet; and forming an Al-based coating by immersing the hot-rolled steel sheet, the cold-rolled steel sheet, or the annealed steel sheet in an Al-based plating bath having a bath temperature of 600° C. or higher, and then cooling the hot-rolled steel sheet, the cold-rolled steel sheet, or the annealed steel sheet to 200° C. or lower at an average cooling rate of slower than 30° C./s.

(4) The method for producing a coated steel sheet according to (3) may further include: post-heating to anneal the coated steel sheet obtained by the forming of the Al-based coating, in a temperature range of 450° C. to 800° C.

(5) A method for producing a coated steel member, includes: melting and casting a steel containing, as a chemical composition, by mass %, C: 0.25% to 0.65%, Si: 0.10% to 1.00%, Mn: 0.30% to 1.00%, P: 0.050% or less, S: 0.0100% or less, N: 0.010% or less, Ti: 0.010% to 0.100%, B: 0.0005% to 0.0100%, Nb: 0.02% to 0.10%, Mo: 0.10% to 1.00%, Cu: 0.15% to 1.00%, Ni: 0.05% to 0.25%, Cr: 0% to 1.00%, V: 0% to 1.00%, Ca: 0% to 0.010%, Al: 0% to 1.00%, Sn: 0% to 1.00%, W: 0% to 1.00%, Sb: 0% to 1.00%, Zr: 0% to 1.00%, REM: 0% to 0.30%, and a remainder consisting of Fe and impurities, to obtain a slab; hot-rolling the slab into a hot-rolled steel sheet; coiling the hot-rolled steel sheet; as necessary, annealing the hot-rolled steel sheet; as necessary, descaling the hot-rolled steel sheet and cold-rolling the hot-rolled steel sheet into a cold-rolled steel sheet; as necessary, annealing the hot-rolled steel sheet or the cold-rolled steel sheet into an annealed steel sheet; forming an Al-based coating on the hot-rolled steel sheet, the cold-rolled steel sheet, or the annealed steel sheet by immersing the hot-rolled steel sheet, the cold-rolled steel sheet, or the annealed steel sheet in an Al-based plating bath having a bath temperature of 600° C. or higher, and then cooling the hot-rolled steel sheet, the cold-rolled steel sheet, or the annealed steel sheet to 200° C. or lower at an average cooling rate of slower than 30° C./s, to obtain a coated steel sheet; and heating the coated steel sheet to an Ac3 point to (Ac3 point+300)° C. in an atmosphere having a dew point of 30° C. or lower at a temperature rising rate of 1.0 to 100° C./s, and then cooling the coated steel sheet to an Ms point or lower at an upper critical cooling rate or faster.

(6) The method for producing a coated steel member according to (5) may further include: post-heating to anneal the coated steel sheet in a temperature range of 450° C. to 800° C. after the forming of the Al-based coating.

Effects of the Invention

According to the aspects of the present invention, it is possible to provide the coated steel member having high tensile strength and excellent hydrogen embrittlement resistance, the coated steel sheet, and the methods for producing the same.

Since the coated steel member of the present invention has high strength and excellent hydrogen embrittlement resistance, when the coated steel member is applied to vehicle components, the coated steel member contributes to an improvement in fuel consumption and collision safety.

EMBODIMENTS OF THE INVENTION

In order to obtain a coated steel member having high tensile strength and excellent hydrogen embrittlement resistance, the inventors investigated influences of a surface layer structure and of a chemical composition and an internal structure of a steel (steel sheet substrate) on these properties. As a result, the following findings were obtained.

Most of materials to be used for hot stamping members that are commonly produced are coated steel sheets of which each surface is subjected to an aluminum plating having excellent corrosion resistance. When hot stamping is performed on the coated steel sheet, an alloying reaction between Al on the surface and Fe of the steel sheet progresses during heating, whereby a coated steel member having an Al—Fe-based coating can be obtained. Most of commonly used steel sheets showing a 1.5 GPa tensile strength class after hot stamping have similar chemical compositions and contain about 0.20 mass % of C, and the strength after the hot stamping is secured by C. Furthermore, in order to secure hardenability during hot stamping, most of steel sheets contain about 1.3 mass % of Mn and about 0.002 mass % of B.

(a) In order to achieve a further reduction in the weight of the vehicle body, the inventors conducted a detailed study for obtaining a high strength member that has a tensile strength of more than 1.5 GPa after hot stamping by means of an increase in C content. As a result, it was found that in terms of tensile strength, an ultrahigh strength of 1.5 GPa or more could be obtained after hot stamping by setting the C content to 0.25 mass % or more. On the other hand, there was a concern about a risk that hydrogen embrittlement susceptibility increased with ultrahigh-strengthening to a tensile strength of 1.5 GPa or more and hydrogen embrittlement cracking was caused by hydrogen invading a heating furnace during production of hot stamping members.

(b) The inventors first investigated a relationship between hydrogen and surface reaction and worked on improving the hydrogen embrittlement resistance by means of a reduction in invading hydrogen amount in a coated steel member having a high-strength Al—Fe-based coating having a tensile strength of more than 1.5 GPa. As a result, it was found that when Cu having a low hydrogen solid solubility was distributed in an outermost layer of the steel, a barrier effect of Cu could suppress the invasion of hydrogen into the steel. The following points can be considered as the reason. That is, when the hot stamp is heated, Hao in the air reacts with the aluminum plating on the surface to be dissociated to 2H because of the catalytic effect, and then some H invades the steel. It is considered that Cu has the effect of reducing the invading hydrogen amount by suppressing dissociation of $H_2$ to 2H, that is, by suppressing the generation of hydrogen atoms.

(c) The inventors further investigated a relationship between a chemical composition or structure of the steel having a tensile strength of more than 1.5 GPa and hydrogen embrittlement susceptibility, and worked on improving the hydrogen embrittlement resistance by means of an increase in critical hydrogen amount (Hc). As a result, first, it was found that the hydrogen embrittlement susceptibility of the steel was reduced, that is, the critical hydrogen amount at which hydrogen embrittlement was not generated was increased by reducing a Mn content. On the other hand, it was also found that when Ni was contained in order to compensate for a decrease in hardenability caused by a reduction in Mn content and to suppress hot embrittlement during production of steel sheets when the above-mentioned Cu was contained, Ni promoted hydrogen embrittlement. As a result of study, the inventors founded that Si was also effective in suppressing hot embrittlement caused by Cu, and even when the Ni content was reduced, steel sheets could be stably produced while minimizing a decrease in critical hydrogen amount by means of an increase in Si content. Furthermore, Si is an element having an effect of improving hardenability by suppressing pearlite precipitation, and Mo is also an element having an effect of enhancing hardenability. Therefore, it was found that the lack of hardenability caused by a reduction in Mn could be compensated for by containing Si and Mo.

Furthermore, when Nb is contained, the internal structure of the steel is fine (refined). Therefore, it was found that when Nb was contained, intergranular fracture which became a base point of hydrogen embrittlement was suppressed and the critical hydrogen amount was increased.

Based on the above findings, the inventors developed a high-strength hot stamping member of which hydrogen embrittlement resistance was greatly improved and of which the strength was more than 1.5 GPa by reducing the invading hydrogen amount and by increasing the critical hydrogen amount of the steel, and a coated steel sheet suitable as a material thereof. Such a steel member is more safely applicable to vehicle bodies while sufficiently reducing a risk of hydrogen embrittlement.

Hereinafter, according to one embodiment of the present invention, requirements of a coated steel member (coated steel member according to the present embodiment), of a coated steel sheet (coated steel sheet according to the present embodiment), and of methods for producing the same will be described in detail.

(A) Coated Steel Member

Figure 1:
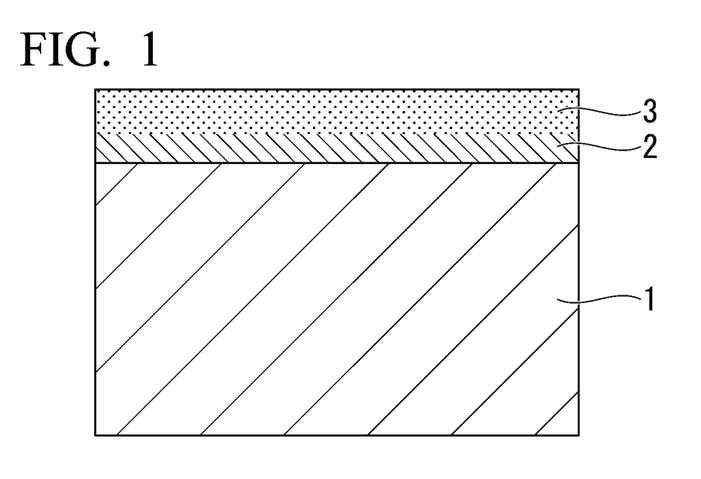
FIG. 1 is a schematic view showing one example of a coated steel member according to the present embodiment.

As shown in FIG. 1, a coated steel member according to the present embodiment has a steel sheet substrate 1 having a predetermined chemical composition and a coating 2 formed on a surface of the steel sheet substrate 1 and containing Al and Fe (hereinafter, may be referred to as an Al—Fe-based coating).

Furthermore, a Cu concentration region 3 having a Cu content equal to or more than a Cu content of the steel sheet substrate is formed in a surface layer area of the coating 2, and as a result, the maximum Cu content in a range from a surface of the coated steel member to a depth of 5.0 μm is 150% or more of the Cu content of the steel sheet substrate.

(A1) Chemical Composition of Steel Sheet Substrate

The steel sheet substrate of the coated steel member according to the present embodiment has a predetermined chemical composition. Specifically, as the chemical composition, by mass %, C: 0.25% to 0.65%, Si: 0.10% to 1.00%, Mn: 0.30% to 1.00%, P: 0.050% or less, S: 0.0100% or less, N: 0.010% or less, Ti: 0.010% to 0.100%, B: 0.0005% to 0.0100%, Nb: 0.02% to 0.10%, Mo: 0.10% to 1.00%, Cu: 0.15% to 1.00%, Ni: 0.05% to 0.25%, Cr: 0% to 1.00%, V: 0% to 1.00%, Ca: 0% to 0.010%, Al: 0% to 1.00%, Sn: 0% to 1.00%, W: 0% to 1.00%, Sb: 0% to 1.00%, Zr: 0% to 1.00%, REM: 0% to 0.30%, and a remainder consisting of Fe and impurities are included.

The reasons for limiting each element are as follows. Here, the chemical composition of the steel sheet substrate refers to a chemical composition of a portion of the coated steel member (for example, a ¼ thickness position of the steel sheet substrate from the surface of the steel sheet substrate) excluding the Al—Fe-based coating of the surface and the Cu concentration region. Hereinafter, % regarding the content is mass % unless otherwise specified. Furthermore, a range indicated by values at both ends interposing "—" therebetween includes the values as a lower limit value and an upper limit value.

C: 0.25% to 0.65%

C is an element that enhances the hardenability of steel and improves the strength of the coated steel member after hardening such as hot stamping. However, when the C content is less than 0.25%, it becomes difficult to secure sufficient strength (more than 1.5 GPa) in the coated steel member after hardening. Therefore, the C content is set to 0.25% or more. The C content is preferably 0.28% or more.

On the other hand, when the C content is more than 0.65%, the strength of the coated steel member after hardening becomes too high, and a decrease in critical hydrogen amount becomes significant. Therefore, the C content is set to 0.65% or less. The C content is preferably 0.60% or less.

Si: 0.10% to 1.00%

Si is an element that is effective in enhancing the hardenability of steel and in stably securing the strength after hardening. Furthermore, Si is an element having an effect of suppressing hot embrittlement caused by Cu during production of a steel sheet and of securing stable productivity. In order to obtain this effect, 0.10% or more of Si needs to be contained. The Si content is preferably 0.35% or more.

On the other hand, when the Si content in the steel is more than 1.00%, a heating temperature required for austenite transformation becomes significantly high during a heat treatment. Accordingly, the cost required for the heat treatment may increase, or ferrite may remain during heating of the hot stamp to decrease the strength of the coated steel member. Therefore, the Si content is set to 1.00% or less. The Si content is preferably 0.60% or less.

Mn: 0.30% to 1.00%

Mn is an element that decreases a critical hydrogen amount of the coated steel member after hardening. In particular, when the Mn content is more than 1.00%, a decrease in critical hydrogen amount becomes significant. Therefore, the Mn content is limited to 1.00% or less. The Mn content is preferably limited to 0.80% or less.

On the other hand, Mn is an element that is very effective in enhancing the hardenability of steel and in stably securing the strength after hardening. Mn is an element that further lowers an Ac3 point to promote the lowering of a hardening treatment temperature. When the Mn content is less than 0.30%, these effects are not sufficient, so that the Mn content is set to 0.30% or more. The Mn content is preferably 0.40% or more.

P: 0.050% or Less

P is an element that decreases the critical hydrogen amount of the coated steel member after hardening. In particular, when the P content is more than 0.050%, a decrease in critical hydrogen amount becomes significant. Therefore, the P content is limited to 0.050% or less. The P content is preferably limited to 0.005% or less. Since it is preferable that the P content is small, the P content may be 0%. However, the P content may be set to 0.001% or more from the viewpoint of cost.

S: 0.0100% or Less

S is an element that decreases the critical hydrogen amount of the coated steel member after hardening. In particular, when the S content is more than 0.0100%, a decrease in critical hydrogen amount becomes significant. Therefore, the S content is limited to 0.0100% or less. The S content is preferably limited to 0.0050% or less. Since it is preferable that the S content is small, the S content may be 0%. However, the S content may be set to 0.0001% or more from the viewpoint of cost.

N: 0.010% or Less

N is an element that decreases the critical hydrogen amount of the coated steel member after hardening. In particular, when the N content is more than 0.010%, coarse nitrides are formed in steel, and the critical hydrogen amount decreases significantly. Therefore, the N content is set to 0.010% or less. The lower limit of the N content does not have to be particularly limited and may be 0%. However, setting the N content to less than 0.0002% leads to an increase in steelmaking cost and is economically undesirable. Therefore, the N content may be set to 0.0002% or more or 0.0008% or more.

Ti: 0.010% to 0.100%

Ti is an element having an action of refining austenite grains by suppressing recrystallization and by suppressing grain growth by means of the formation of fine carbides when the steel sheet is subjected to a heat treatment by being heated to a temperature of the Ac3 point or higher. Therefore, an effect of increasing the critical hydrogen amount of the coated steel member can be obtained by containing Ti. Furthermore, Ti is an element that is preferentially bonded to N in the steel to suppress the consumption of B caused by the precipitation of BN and to promote an effect of enhancing the hardenability induced by B to be described later. When the Ti content is less than 0.010%, the above effects cannot be sufficiently obtained. Therefore, the Ti content is set to 0.010% or more. The Ti content is preferably 0.015% or more.

On the other hand, when the Ti content is more than 0.100%, the amount of precipitation of TiC increases and C is consumed, so that the strength of the coated steel member after hardening decreases. Therefore, the Ti content is set to 0.100% or less. The Ti content is preferably 0.080% or less.

B: 0.0005% to 0.0100%

B is an important element since B has an action of dramatically enhancing the hardenability of steel even with a trace amount. Furthermore, B is an element that is segregated at grain boundaries to strengthen the grain boundaries and to increase the critical hydrogen amount, and that suppresses the growth of austenite grains when the steel sheet is heated. When the B content is less than 0.0005%, the above effects may not be sufficiently obtainable. Therefore, the B content is set to 0.0005% or more. The B content is preferably 0.0010% or more.

On the other hand, when the B content is more than 0.0100%, a large amount of coarse compounds are precipitated, and the critical hydrogen amount of the coated steel member decreases. Therefore, the B content is set to 0.0100% or less. The B content is preferably 0.0080% or less.

Nb: 0.02% to 0.10%

Nb is an important element since Nb has an action of forming fine carbides and of increasing the critical hydrogen amount of steel by means of the refining effect. When the Nb content is less than 0.02%, the above effects may not be sufficiently obtainable. Therefore, the Nb content is set to 0.02% or more. The Nb content is preferably 0.03% or more.

On the other hand, when the Nb content is more than 0.10%, the carbides become coarse and the critical hydrogen amount of the coated steel member decreases. Therefore, the Nb content is set to 0.10% or less. The Nb content is preferably 0.08% or less.

Mo: 0.10% to 1.00%

Mo is an element that is very effective in enhancing the hardenability of steel and in stably securing the strength of the coated steel member after hardening. In particular, a synergistic effect of improving the hardenability can be obtained by containing a compound of Mo and B. When the Mo content is less than 0.10%, these effects are not sufficient, so that the Mo content is set to 0.10% or more. The Mo content is preferably 0.15% or more and more preferably 0.20% or more.

On the other hand, when the Mo content is more than 1.00%, the above effects are saturated and the cost increases. Furthermore, since Mo has an action of stabilizing iron carbides, when the Mo content is more than 1.00%, coarse iron carbides may remain undissolved when the steel sheet is heated, and the critical hydrogen amount of the coated steel member after hardening may decrease. Therefore, the Mo content is set to 1.00% or less. The Mo content is preferably 0.80% or less.

Cu: 0.15% to 1.00%

Cu is a very important element since Cu has an action of reducing hydrogen that is concentrated in a surface layer of a steel and that invades a hot stamping member during heating in the production of the hot stamping member. Furthermore, Cu is an element that is effective in enhancing the hardenability of steel and in stably securing the strength of the coated steel member after hardening. Furthermore, Cu is an element that improves corrosion resistance in a corrosive environment. In order to obtain the above effects, the Cu content is set to 0.15% or more. The Cu content is preferably 0.20% or more.

On the other hand, when the Cu content is more than 1.00%, the above effects are saturated and the cost increases. Therefore, the Cu content is set to 1.00% or less. The Cu content is preferably 0.80% or less.

Ni: 0.05% to 0.25%

Ni is an important element to suppress hot embrittlement caused by Cu during production of a steel sheet and to secure stable productivity. When the Ni content is less than 0.05%, the above effects may not be sufficiently obtainable. Therefore, the Ni content is set to 0.05% or more. The Ni content is preferably 0.10% or more.

On the other hand, when the Ni content is more than 0.25%, the critical hydrogen amount of the coated steel member decreases. Therefore, the Ni content is set to 0.25% or less. The Ni content is preferably 0.20% or less.

In order to improve hardenability, strength, critical hydrogen amount, deoxidation, and corrosion resistance, in addition to the above elements, the coated steel member according to the present embodiment may contain one or more elements selected from Cr, V, Ca, Al, Sn, W, Sb, Zr, and REM to be described below. These elements are optional elements and do not necessarily have to be contained. Therefore, the lower limit thereof is 0%.

Cr: 0% to 1.00%

Cr is an element that is effective in enhancing the hardenability of steel and in stably securing the strength of the coated steel member after hardening. Therefore, Cr may be contained. In order to obtain the above effects, the Cr content is preferably 0.01% or more, more preferably 0.05% or more, and even more preferably 0.08% or more.

On the other hand, when the Cr content is more than 1.00%, the above effects are saturated and the cost increases. Furthermore, since Cr has an action of stabilizing iron carbides, when the Cr content is more than 1.00%, coarse iron carbides may remain undissolved when the steel sheet is heated, and the critical hydrogen amount of the coated steel member after hardening may decrease. Therefore, if Cr is contained, the Cr content is set to 1.00% or less. The Cr content is preferably 0.80% or less.

V: 0% to 1.00%

V is an element that forms fine carbides and increases the critical hydrogen amount of a steel by means of the refining effect or hydrogen trapping effect. Therefore, Cr may be contained. In order to obtain the above effects, V is contained preferably in an amount of 0.01% or more and more preferably in an amount of 0.10% or more.

On the other hand, when the V content is more than 1.00%, the above effects are saturated and the economic efficiency decreases. Therefore, if V is contained, the V content is set to 1.00% or less.

Ca: 0% to 0.010%

Ca is an element having an effect of refining inclusions in steel and of increasing the critical hydrogen amount of the coated steel member after hardening. Therefore, Cr may be contained. In order to obtain the above effect, the Ca content is set to preferably 0.001% or more and more preferably 0.002% or more.

On the other hand, when the Ca content is more than 0.010%, the effect is saturated and the cost increases. Therefore, if Ca is contained, the content is set to 0.010% or less. The Ca content is preferably 0.005% or less and more preferably 0.004% or less.

Al: 0% to 1.00%

Al is an element commonly used as a steel deoxidizing agent. Therefore, Cr may be contained. In order to obtain the above effect, Al is preferably contained in an amount of 0.01% or more.

On the other hand, when the Al content is more than 1.00%, the above effect is saturated and the economic efficiency decreases. Therefore, if Al is contained, the Al content is set to 1.00% or less.

Sn: 0% to 1.00%

Sn is an element that improves corrosion resistance in a corrosive environment. Therefore, Cr may be contained. In order to obtain the above effect, Sn is preferably contained in an amount of 0.01% or more.

On the other hand, when the Sn content is more than 1.00%, the grain boundary strength decreases, and the critical hydrogen amount of the coated steel member after hardening decreases. Therefore, if Sn is contained, the Sn content is set to 1.00% or less.

W: 0% to 1.00%

W is an element capable of enhancing the hardenability of steel and of stably securing the strength of the coated steel member after hardening. Therefore, Cr may be contained. Furthermore, W is an element that improves corrosion resistance in a corrosive environment. In order to obtain the above effects, W is preferably contained in an amount of 0.01% or more.

On the other hand, when the W content is more than 1.00%, the above effects are saturated and the economic efficiency decreases. Therefore, if W is contained, the W content is set to 1.00% or less.

Sb: 0% to 1.00%

Sb is an element that improves corrosion resistance in a corrosive environment. Therefore, Cr may be contained. In order to obtain the above effect, the Sb content is preferably set to 0.01% or more.

On the other hand, when the Sb content is more than 1.00%, the grain boundary strength decreases, and the critical hydrogen amount of the coated steel member after hardening decreases. Therefore, if Sb is contained, the Sb content is set to 1.00% or less.

Zr: 0% to 1.00%

Zr is an element that improves corrosion resistance in a corrosive environment. Therefore, Cr may be contained. In order to obtain the above effect, the Zr content is preferably set to 0.01% or more.

On the other hand, when the Zr content is more than 1.00%, the grain boundary strength decreases, and the critical hydrogen amount of the coated steel member after hardening decreases. Therefore, if Zr is contained, the Zr content is set to 1.00% or less.

REM: 0% to 0.30%

Similarly to Ca, REM is an element having an effect of refining inclusions in steel and of increasing the critical hydrogen amount of the coated steel member after hardening. Therefore, Cr may be contained. In a case where the above effect is desired to be obtained, the REM content is set to preferably 0.01% or more and more preferably 0.02% or more.

On the other hand, when the REM content is more than 0.30%, the effect is saturated and the cost increases. Therefore, if REM is contained, the REM content is set to 0.30% or less. The REM content is preferably 0.20% or less.

Here, REM refers to a total of 17 elements including Sc, Y, and lanthanoids such as La and Nd, and the REM content means the total amount of these elements. REM is added to molten steel using, for example, a Fe—Si-REM alloy, and this alloy contains, for example, La, Nd, Ce, and Pr.

In the chemical composition of the coated steel member of the present embodiment, the remainder other than the elements described above consists of Fe and impurities.

Here, the "impurities" are components that are mixed because of various factors including raw materials such as ore and scrap and a production process when the steel sheet is industrially produced, and are acceptable in a range without adversely affecting the properties of the coated steel member according to the present embodiment.

The chemical composition can be obtained by the following method.

The chemical composition can be obtained by averaging contents obtained by performing elemental analysis using a general method such as ICP from a ¼ thickness position from the surface of the steel sheet substrate in a sheet thickness direction.

(A2) Coating

The coated steel member according to the present embodiment has a coating containing Al and Fe (Al—Fe-based coating) on the surface of the steel sheet substrate described above. In the present embodiment, the Al—Fe-based coating is a coating primarily containing Al and Fe, and preferably contains Al and Fe in a total amount of 70% or more in an average composition. Furthermore, the Al—Fe-based coating is also referred to as a film, an alloy plating layer, or an intermetallic compound layer. In the Al—Fe-based coating, in addition to Al and Fe, Si, Mg, Ca, Sr, Ni, Cu, Mo, Mn, Cr, C, Nb, Ti, B, V, Sn, W, Sb, Zn, Co, In, Bi, and REM may be further contained and the remainder may be impurities.

A thickness of the coating is not particularly limited, but is preferably 5 to 50

The Al, Fe, Si, etc. content in the Al—Fe-based coating is obtained by performing glow discharge emission analysis (GDS) from the surface of the coated steel member (that is, surface of the coating) in the thickness direction. Specifically, Al, Fe, Si, etc. content is obtained by performing glow discharge emission analysis (GDS) in the thickness direction of the steel member (sheet thickness direction of the steel sheet substrate) from the surface of the coated steel member at an approximately ¼ width position (short side) from a width direction end portion of the coated steel member.

In the present embodiment, the Al—Fe-based coating is a region where the Fe content is less than 95 mass % when measurement by GDS is performed from the surface of the coated steel member. Furthermore, the steel sheet substrate is a region where the Fe content is 95 mass % or more. That is, in the coated steel member according to the present embodiment, since the Fe content tends to increase from the surface toward the steel sheet substrate, when glow discharge emission analysis (GDS) is performed in the thickness direction, a range where the Fe content is less than 95 mass % is determined to be the coating, a position where the Fe content is 95 mass % is determined to be an interface between the coating and the steel sheet substrate, and a range therebelow is determined to be the steel sheet substrate.

(A3) Maximum Cu Content in Range from Surface to Depth of 5.0 μm

The coated steel member according to the present embodiment has a Cu concentration region in a surface layer of the Al—Fe-based coating described above, and the maximum Cu content in a range from the surface of the coated steel member (may be the surface of the coating when the coating is an outermost surface) to a depth of 5.0 μm in a depth direction (thickness direction of the steel member) is 150% or more of the Cu content of the steel sheet substrate.

In the present embodiment, the Cu concentration region is a region where the Cu content is 100% or more of the Cu content of the steel sheet substrate when measurement by GDS is performed from the surface of the coated steel member in the thickness direction. In the coated steel member according to the present embodiment, the Cu concentration region is formed, for example, in a range from the surface to a depth of 10.0 μm or more, and the maximum Cu content particularly in the range from the surface to a depth of 5.0 μm is 150% or more of the Cu content of the steel sheet substrate.

The amount of hydrogen invading the coated steel member is reduced and hydrogen embrittlement resistance is improved by controlling the Cu content of a surface layer area of the coating. When the maximum Cu content in the range from the surface to a depth of 5.0 μm where there is no Cu concentration region is less than 150% of the Cu content contained in the steel sheet substrate, the invading hydrogen amount is not sufficiently reduced, and there is a risk of hydrogen embrittlement cracking. The maximum Cu content in the range from the surface to a depth of 5.0 μm is preferably 180% or more of the Cu content of the steel sheet substrate and more preferably 200% or more.

An upper limit of the maximum Cu content in the range from the surface to a depth of 5.0 μm is not particularly specified, but Cu can be concentrated up to 1,000% of the Cu content contained in the steel sheet substrate.

The maximum Cu content in the range from the surface of the coated steel member to a depth of 5.0 μm is obtained by performing glow discharge emission analysis (GDS) in the thickness direction of the coated steel member from the surface of the coated steel member. Specifically, glow discharge emission analysis (GDS) is performed from the surface of the coated steel member in the thickness direction at the approximately ¼ width position (short side) from the width direction end portion of the coated steel member to obtain the maximum Cu content in the range from the surface of the coated steel member to a depth of 5.0 μm. This measurement is performed five times, and the average value of the maximum Cu contents obtained in the measurements is determined to be the maximum Cu content in the range from the surface of the coated steel member to a depth of 5.0 μm. When a coating is applied to the coated steel member, only the coating film portion is removed and GDS is performed.

(A4) Internal Structure of Steel Sheet Substrate

The internal structure (metallographic structure) of the steel sheet substrate of the coated steel member according to the present embodiment is a structure primarily containing martensite having high strength. Preferably, martensite occupies 70% or more in terms of area fraction. More preferably, martensite occupies 80% or more.

The internal structure of the steel sheet substrate may contain residual austenite, bainite, ferrite, or pearlite as the remainder other than martensite. Martensite also includes tempered martensite and auto-tempered martensite. The auto-tempered martensite is tempered martensite generated during cooling at the time of hardening without a heat treatment for tempering, and is generated by in-situ tempering of martensite generated due to self-heating associated with martensitic transformation.

The internal structure of the steel sheet substrate can be determined by the following method.

The area fraction of martensite (including tempered martensite and auto-tempered martensite) is measured by a transmission electron microscope (TEM) and an electron beam diffractometer attached to the TEM. A measurement sample is cut out from a width ¼ portion of the steel member or a thickness ¼ portion of the steel sheet substrate to be used as a thin film sample for TEM observation. As the sample, a sample cut out from a cross section in the direction perpendicular to the rolling direction is used. Furthermore, the range of TEM observation is set to a range of 400 μm² in terms of area. The electron beam diffraction pattern of the thin film sample makes it possible to distinguish between martensite and bainite which are body-centered cubic lattices, and residual austenite which is a face-centered cubic lattice. Then, iron carbides ($Fe_3C$) in martensite and bainite are found by the diffraction pattern, and the precipitation morphology thereof is observed to measure microstructural fractions of martensite and bainite. Specifically, regarding the precipitation morphology, precipitation in three directions is determined to be martensite, and precipitation limited to one direction is determined to be bainite. The microstructural fractions of martensite and bainite measured by the TEM are measured in area %, but in the coated steel member according to the present embodiment, since the metallographic structure of the steel sheet substrate has isotropy, the values of the area fractions can be directly replaced into volume fractions. Carbides are observed to distinguish between martensite and bainite, but in the present embodiment, carbides are not included in the volume fraction of the structure.

Ferrite or pearlite that may be present as the remainder in microstructure can be easily confirmed with an optical microscope or a scanning electron microscope. Specifically, a measurement sample is cut out from a width ¼ portion of the steel member or a thickness ¼ portion of the steel sheet substrate to be used as a sample for observation. As the sample, a sample cut out from a cross section in the direction orthogonal to the rolling direction is used. Furthermore, the observation range of the microscope is set to a range of 40,000 μm² in terms of area. The cut sample is mechanically polished and then mirror-finished. Next, etching is performed with a nital etching solution to reveal ferrite and pearlite, and the cut sample is observed with the microscope to confirm the presence of ferrite or pearlite. A structure in which ferrite and cementite are alternately arranged in layers is determined to be pearlite, and a structure in which cementite is precipitated in particles is determined to be bainite.

(A5) Properties of Coated Steel Member

In the coated steel member according to the present embodiment, the surface layer of the Al—Fe-based coating is controlled as described above, so that the dissociation of $H_2O$ to hydrogen atoms on the surface of a steel such as a coated steel sheet in a heating furnace is suppressed, and the invading hydrogen amount into the steel is reduced. Furthermore, in the coated steel member according to the present embodiment, not only the invading hydrogen amount is small, but also the chemical composition and the internal structure are controlled as described above, so that the critical hydrogen amount of the steel is large. Therefore, the tensile strength is a high strength of more than 1.5 GPa, and the hydrogen embrittlement resistance is excellent.

In the present embodiment, the invading hydrogen amount is evaluated by the amount of diffusible hydrogen obtained by raising the temperature to 300° C. at 100° C./hr in temperature-raising hydrogen analysis. For example, the coated steel sheet is heated under conditions that are different in the amount of moisture in the atmosphere, that is, that are different in dew point, and test pieces are cut out after hot stamping and are evaluated by temperature-raising hydrogen analysis using gas chromatograph.

In the coated steel member according to the present embodiment, regarding the invading hydrogen amount, a small amount of diffusible hydrogen (He) of 0.30 mass ppm or less can be obtained in an atmosphere having a dew point of 30° C. or lower. Hereinafter, ppm regarding the hydrogen amount is mass ppm unless otherwise specified.

Furthermore, in the present embodiment, the critical hydrogen amount is evaluated by performing hot stamping under the above-mentioned conditions that are different in dew point, and then by applying stress. For example, the coated steel sheet is heated under conditions that are different in dew point, and U-bent test pieces that are formed into a U shape by performing hot stamping are tightened with a stress equal to or less than a yield strength (for example, 60% of the tensile strength) and are left, and as a result, the presence or absence of cracks is observed, and evaluation is performed by the hydrogen amount at a dew point of a limit where no cracking occurs.

In the coated steel member according to the present embodiment, the following excellent critical hydrogen amounts can be obtained: 0.30 ppm or more when the tensile strength is less than 2.1 GPa, 0.25 ppm or more when the tensile strength is 2.1 GPa or more and less than 2.5 GPa, and 0.20 ppm or more when the tensile strength is 2.5 GPa or more.

The shape of the coated steel member is not particularly limited. That is, the coated steel member may be a flat sheet or a formed body. The coated steel member that is subjected to hot forming is a formed body in many cases, and in the present embodiment, the case of a formed body and the case of a flat sheet are collectively referred to as a "coated steel member". Furthermore, the coated steel member may be a tailored property material having different strengths depending on points.

(B) Coated Steel Sheet

Next, the coated steel sheet according to the present embodiment will be described. The coated steel sheet according to the present embodiment is suitable as a material of the coated steel member according to the present embodiment described above.

Figure 2:
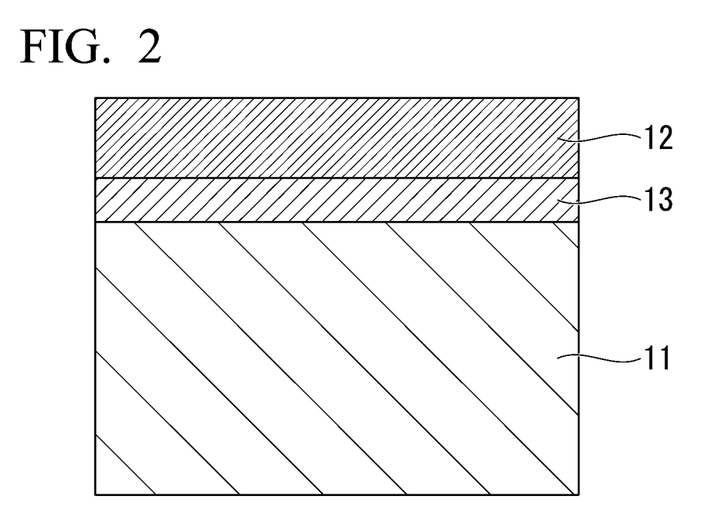
FIG. 2 is a schematic view showing one example of a coated steel sheet according to the present embodiment.

As shown in FIG. 2, the coated steel sheet according to the present embodiment has a steel sheet 11 having a predetermined chemical composition, a coating 12 containing Al on a surface of the steel sheet (hereinafter, may be referred to as an Al-based coating), and a boundary portion 13 formed between the steel sheet 11 and the coating 12 (Al-based coating).

Furthermore, in the coated steel sheet to the present embodiment, the maximum Cu content of the boundary portion between the Al-based coating and the steel sheet is 80% or more of the average Cu content in the steel sheet.

(B1) Chemical Composition of Steel Sheet

The range of a chemical composition of the steel sheet forming the coated steel sheet is the same as the chemical composition of the steel sheet substrate in the coated steel member described above, and the reason for its limitation is also the same. Here, the chemical composition of the steel sheet refers to a chemical composition of a portion of the coated steel sheet excluding the Al-based coating of the surface and the boundary portion between the Al-based coating and the steel sheet. For example, the chemical composition is obtained by taking a ¼ thickness position from the surface of the steel sheet in the sheet thickness direction as a representative position, and by performing elemental analysis at the position using a general method such as ICP.

(B2) Coating

The coated steel sheet according to the present embodiment has the coating (Al-based coating) containing Al, on the surface of the steel sheet. The Al-based coating is a coating primarily containing Al, and preferably contains 40% or more of Al in an average composition. The Al-based coating is also referred to as a coating or a plating layer. In addition to Al, the Al-based coating may further contain Si, Fe, Mg, Ti, Zn, Sb, Sn, Ni, Cu, Co, In, Bi, Ca, and REM, and the remainder may be impurities. Generally, the Al-based coating contains about 10 mass % of Si in many cases.

The kind of coating is not limited. For example, the coating is a coating formed by hot-dip plating, electro plating, thermal spraying, or the like.

The thickness of the coating is not particularly limited, but is preferably 5 to 50 μm.

(B3) Boundary Portion

In the coated steel sheet according to the present embodiment, the maximum Cu content of the boundary portion between the coating and the steel sheet is 80% or more of the Cu content (average content) of the steel sheet.

When the maximum Cu content of the boundary portion of the coated steel sheet is less than 80% of the Cu content of the steel sheet, in the coated steel member obtained by hot stamping the coated steel sheet, the maximum Cu in a range from the surface to a depth of 5.0 μm is low. In this case, the invading hydrogen amount is not sufficiently reduced, and there is a risk of hydrogen embrittlement cracking.

The maximum Cu content of the boundary portion between the coating and the steel sheet is preferably 100% or more of the Cu content (average content) of the steel sheet and more preferably 120% or more.

The upper limit of the maximum Cu content of the boundary portion is not particularly specified, but may be 150% of the Cu content of the steel sheet. In the present embodiment, the boundary portion is a region where the Fe content is 85 mass % or more and less than 95 mass % when glow discharge emission analysis (GDS) is performed from the surface of the coated steel sheet in the sheet thickness direction at an approximately ¼ width position (short side) from a width direction end portion of the coated steel sheet. On the other hand, a region where the Fe content is less than 85 mass % is determined to be the coating, and a region where the Fe content is 95 mass % or more is determined to be the steel sheet.

The boundary portion is formed when the Al-based coating is formed on the surface of the steel sheet.

The maximum Cu content of the boundary portion can be obtained as follows.

The maximum Cu content of the boundary portion is obtained by performing glow discharge emission analysis (GDS) in the sheet thickness direction of the steel sheet from the surface of the coated steel sheet. Specifically, glow discharge emission analysis (GDS) is performed from the surface of the coated steel sheet (that is, surface of the coating) in the sheet thickness direction at the approximately ¼ width position (short side) from the width direction end portion of the coated steel sheet, a region where the Fe content is 85 mass % or more and less than 95 mass % is determined to be the boundary portion, and the maximum Cu content is obtained in the range of the boundary portion. This measurement is performed five times, and the average value of the maximum Cu contents obtained in the measurements is taken as the maximum Cu content of the boundary portion.

The Cu content of the steel sheet can be obtained by averaging the contents obtained by performing elemental analysis using a general method such as ICP from the ¼ width position from the surface of the steel sheet in the sheet thickness direction.

(B4) Internal Structure of Steel Sheet

The internal structure (metallographic structure) of the steel sheet included in the coated steel sheet according to the present embodiment is not limited, but is ferrite or pearlite in many cases. In conditions of a production method to be described later, bainite, martensite, and residual austenite may be contained. The martensite also includes tempered or auto-tempered martensite. The auto-tempered martensite is tempered martensite generated during cooling at the time of hardening without a heat treatment for tempering, and is generated by in-situ tempering of martensite generated due to heating associated with martensitic transformation. The internal structure of the steel sheet is a structure of the steel sheet excluding the above-mentioned boundary portion.

The internal structure of the steel sheet can be determined by the same method as that of the internal structure of the steel sheet substrate described above.

Next, methods for producing the coated steel sheet and the coated steel member will be described.

(C) Method for Producing Coated Steel Sheet

The coated steel sheet according to the present embodiment can be produced by using a production method including the following steps.

Production Method (i) A slab preparation step of melting and casting a steel having the above-mentioned chemical composition, to produce a slab.

(ii) A hot rolling step of hot-rolling the obtained slab into a hot-rolled steel sheet.

(iii) A coiling step of coiling the hot-rolled steel sheet.

(iv) A hot-rolled sheet annealing step of annealing the hot-rolled steel sheet after the coiling step as necessary.

(v) A cold rolling step of descaling the hot-rolled steel sheet after the coiling step or after the hot-rolled sheet annealing step as necessary, and of cold-rolling the hot-rolled steel sheet into a cold-rolled steel sheet.

(vi) An annealing step of annealing the hot-rolled steel sheet or the cold-rolled steel sheet into an annealed steel sheet as necessary.

(vii) A coating step of applying an Al-based coating to the hot-rolled steel sheet, the cold-rolled steel sheet, or the annealed steel sheet to obtain a coated steel sheet.

Hereinafter, each step will be described.

<Slab Preparation Step>

In the slab preparation step, a steel having the above-mentioned chemical composition is melted and casted to produce a slab provided for hot rolling. For example, a slab can be used that is produced by melting molten steel having the above chemical composition using a converter, an electric furnace, or the like and by performing a continuous casting method thereon. Instead of the continuous casting method, an ingot-making method, a thin slab casting method, or the like may be adopted.

<Hot Rolling Step>

In the hot rolling step, the slab is heated, subjected to rough rolling, then subjected to descaling as necessary, and finally subjected to finish rolling. Hot rolling conditions are not limited.

<Coiling Step>

In the coiling step, for example, the hot-rolled steel sheet after hot rolling is coiled in a temperature range of 800° C. or lower. When the coiling temperature is higher than 800° C., the hot-rolled steel sheet is coiled almost without progress in transformation, and transformation progresses in the coil, so that the coil shape may be defective, which is not preferable.

<Hot-Rolled Sheet Annealing Step>

The hot-rolled sheet annealing step does not necessarily have to be performed, but when the hot-rolled sheet annealing step is performed, for example, the hot-rolled steel sheet is annealed at 450° C. to 800° C. for five hours or more in an atmosphere containing 80 vol % or more of nitrogen or in the atmosphere.

<Cold Rolling Step>

In the cold rolling step, the hot-rolled steel sheet after the hot-rolled sheet annealing step (in a case where the hot-rolled sheet annealing step is not performed, the hot-rolled steel sheet after the coiling step) is subjected to descaling and is cold-rolled into a cold-rolled steel sheet. Descaling and cold rolling do not necessarily have to be performed. However, in a case where cold rolling is performed, the cumulative rolling reduction in the cold rolling is preferably set to 30% or more from the viewpoint of securing good flatness. On the other hand, in order to prevent the load from becoming excessive, the cumulative rolling reduction in the cold rolling is preferably set to 80% or less.

The descaling method is not particularly limited, but pickling is preferable. Furthermore, in a case where pickling is performed, it is preferable that only iron scales are removed by performing pickling under a hydrochloric acid or sulfuric acid condition.

<Annealing Step>

In the annealing step before coating, the hot-rolled steel sheet or the cold-rolled steel sheet is annealed in a temperature range of 700° C. to 950° C. as necessary to obtain an annealed steel sheet.

<Coating Step>

In the coating step, an Al-based coating is applied to form the Al-based coating on a surface of a steel sheet (hot-rolled steel sheet, the cold-rolled steel sheet, or the annealed steel sheet) to obtain a coated steel sheet. A method for forming the Al-based coating is not particularly limited, and a hot-dip plating method, an electro plating method, a vacuum vapor deposition method, a cladding method, a thermal spraying method, and the like can be used. The hot-dip plating method is the most popular in the industry.

When hot-dipping plating is performed, in order to obtain a maximum Cu content of 80% or more of the Cu content of the steel sheet of the boundary portion between the steel sheet and the coating be, the steel sheet is immersed in an Al-based plating bath at 600° C. or higher to form an Al-based coating, and then is cooled to 200° C. or lower at an average cooling rate of slower than 30° C./s. In this case, Cu contained in the steel sheet is diffused to the boundary portion between the Al-based coating and the steel sheet, and the maximum Cu content of the boundary portion can be 80% or more of the Cu content of the steel sheet.

When the bath temperature is less than 600° C., the wettability of the plating is not sufficient, and an area where the coating is defective may reveal. When the cooling stop temperature is higher than 200° C., the cooling rate in a temperature range therebelow is 30° C./s or faster, and the maximum Cu content of the boundary portion may be less than 80% of the Cu content of the steel sheet. When the average cooling rate is 30° C./s or faster, Cu contained in the steel sheet may not be sufficiently diffused to the boundary portion between the Al-based coating and the steel sheet, and the maximum Cu content of the boundary portion may be less than 80% of the Cu content of the steel sheet.

The average cooling rate is preferably slower than 15° C./s. In this case, the diffusion of Cu is more promoted.

Furthermore, when hot-dip plating is performed, in addition to Al, Fe is mixed in the plating bath as an impurity in many cases. Furthermore, in addition to the above-mentioned elements, Si, Ni, Mg, Ti, Zn, Sb, Sn, Cu, Co, In, Bi, Ca, mischmetal, and the like may be contained in the plating bath as long as Al is contained in an amount of 70 mass % or more.

In the case of performing hot-dip plating, after the annealed steel sheet after the annealing step is cooled to room temperature, the temperature may be raised to 650° C. to 750° C. near the plating bath temperature again and then plating may be performed, or the annealed steel sheet after annealing may be cooled to 650° C. to 750° C. near the plating bath temperature and then hot-dip plating may be performed without cooling to room temperature once.

Pretreatments and post-treatments of the Al-based coating are not particularly limited, and precoating, solvent coating, an alloying treatment, temper rolling, or the like can be performed. In particular, alloying as a post-heat treatment is desirable since the alloying increases the Cu content of the boundary portion. In the case of alloying, it is preferable that, for example, annealing that is retained at 450° C. to 800° C. for 180 seconds or longer is performed as a post-heat treatment. When the heating temperature is lower than 450° C. or the retention time is shorter than 180 seconds, the diffusion of Cu is slow, and the effect of increasing the Cu content of the boundary portion can be hardly obtained. On the other hand, when the heating temperature is higher than 800° C., a shape defect may occur and the hardness of the coated steel sheet may increase excessively depending on the cooling rate thereafter, thereby making it difficult to coil the coated steel sheet into a coil shape, which is not desirable.

The retention time condition is not limited, but is preferably set to 900 seconds or shorter.

Furthermore, temper rolling is useful for shape adjustment and, for example, a reduction of 0.1% to 0.5% may be performed after the coating step or after the post-heating.

(D) Method for Producing Coated Steel Member

Next, a method for producing the coated steel member according to the present embodiment will be described.

The coated steel member according to the present embodiment in which a Cu concentration region is formed in the surface layer of the Al—Fe-based coating and in which the maximum Cu content in a range from the surface to a depth of 5.0 μm is 150% or more of the Cu content of the steel sheet substrate can be obtained by applying a heat treatment to be described later to the coated steel sheet produced as described above.

<Heat Treatment>

For example, heat treatment conditions are conditions under which the coated steel sheet obtained by the above method is heated to the Ac3 point to (Ac3 point+300)° C. at a temperature rising rate of 1.0 to 100° C./s and is cooled to an Ms point or lower at an upper critical cooling rate or faster.

When the temperature rising rate is slower than 1.0° C./s, the productivity of the heat treatment decreases, which is not preferable. On the other hand, when the temperature rising rate is faster than 100° C./s, a duplex grain structure is formed and the critical hydrogen amount decreases, which is not preferable.

Furthermore, when the heat treatment temperature is lower than the Ac3 point, ferrite remains after cooling and the strength is insufficient, which is not preferable. On the other hand, when the heat treatment temperature is higher than Ac3 points+300° C., the structure becomes coarse and the critical hydrogen amount decreases, which is not preferable.

The upper critical cooling rate is a minimum cooling rate at which austenite is supercooled to generate martensite without causing precipitation of ferrite and pearlite in the structure, and when cooling is performed at an average cooling rate lower than the upper critical cooling rate, ferrite and pearlite are generated, so that the strength is insufficient.

During heating, retention may be performed in a range of the heating temperature±10° C. for 1 to 300 seconds. Furthermore, after cooling, a tempering treatment may be performed in a temperature range of about 100° C. to 600° C. in order to adjust the strength of the steel member.

The Ac3 point, the Ms point, and the upper critical cooling rate are measured by the following method.

Strip-shaped test pieces each having a width of 30 mm and a length of 200 mm are cut out from a steel sheet having the same chemical composition as that of the steel member according to the present embodiment, and the test pieces are heated to 1,000° C. at a temperature rising rate of 10° C./s in a nitrogen atmosphere, held at the temperature for five minutes, and then cooled to room temperature at various cooling rates. The cooling rates are set at an interval of 10° C./s from 1° C./s to 100° C./s. By measuring a change in the thermal expansion of each of the test pieces during heating and cooling at that time, the Ac3 point and the Ms point are measured. Furthermore, among the test pieces cooled at the above cooling rates, the minimum cooling rate at which ferrite is not precipitated is defined as the upper critical cooling rate.

Here, in the series of heat treatments, hot forming such as hot stamping may be performed while cooling to the Ms point is performed after heating in a temperature range of the Ac3 point to (Ac3 point+300)° C., that is, at the same time a cooling step is performed at the upper critical cooling rate or faster. Exemplary examples of the hot forming are bending, drawing, stretching, hole widening, flange forming, and the like. Furthermore, the present invention may be applied to a forming method such as roll forming other than press forming as long as a device that cools the steel sheet simultaneously with or immediately after forming is provided. In a case where the thermal history described above is followed, hot forming may be repeatedly performed.

As described above, in the present embodiment, both a formed body obtained by hot forming and a flat sheet obtained by performing only a heat treatment are collectively referred to as a "coated steel member".

Furthermore, hot forming or a heat treatment may be performed on a part of the steel to obtain a coated steel member having regions having different strengths.

The series of heat treatments can be performed by any method, and may be performed by, for example, induction heating hardening, energization heating, infrared heating, or furnace heating.

EXAMPLES

Hereinafter, the present invention will be described more specifically with reference to examples, but the present invention is not limited thereto.

First, in producing a coated steel sheet and a coated steel member, steels having the chemical compositions shown in Tables 1A and 1B were melted to obtain slabs for hot rolling.

TABLE 1A

| | Steel No. | Chemical composition (mass %) and remainder consisting of Fe and impurities | | | | | | | | | | |
|---|---|---|---|---|---|---|---|---|---|---|---|---|
| | | C | Si | Mn | P | S | N | Ti | B | Nb | Mo | Cu | Ni |
| Invention Example | A1 | 0.27 | 0.60 | 0.85 | 0.010 | 0.0020 | 0.005 | 0.030 | 0.0020 | 0.05 | 0.30 | 0.26 | 0.13 |
| | A2 | 0.55 | 0.28 | 0.35 | 0.005 | 0.0004 | 0.003 | 0.027 | 0.0023 | 0.03 | 0.20 | 0.30 | 0.10 |

TABLE 1A-continued

| | | C | Si | Mn | P | S | N | Ti | B | Nb | Mo | Cu | Ni |
|---|---|---|---|---|---|---|---|---|---|---|---|---|---|
| | A3 | 0.36 | 0.20 | 0.62 | 0.009 | 0.0008 | 0.005 | 0.034 | 0.0023 | 0.05 | 0.19 | 0.25 | 0.12 |
| | A4 | 0.33 | 0.80 | 0.60 | 0.008 | 0.0012 | 0.003 | 0.040 | 0.0028 | 0.05 | 0.20 | 0.26 | 0.11 |
| | A5 | 0.40 | 0.30 | 0.35 | 0.009 | 0.0007 | 0.004 | 0.033 | 0.0030 | 0.04 | 0.19 | 0.28 | 0.12 |
| | A6 | 0.28 | 0.27 | 0.90 | 0.008 | 0.0009 | 0.006 | 0.030 | 0.0027 | 0.04 | 0.22 | 0.32 | 0.12 |
| | A7 | 0.28 | 0.30 | 0.55 | 0.040 | 0.0004 | 0.004 | 0.030 | 0.0023 | 0.03 | 0.23 | 0.23 | 0.10 |
| | A8 | 0.28 | 0.32 | 0.60 | 0.010 | 0.0080 | 0.003 | 0.028 | 0.0023 | 0.04 | 0.23 | 0.25 | 0.11 |
| | A9 | 0.29 | 0.45 | 0.60 | 0.014 | 0.0011 | 0.008 | 0.030 | 0.0027 | 0.05 | 0.19 | 0.24 | 0.12 |
| | A10 | 0.30 | 0.29 | 0.78 | 0.010 | 0.0013 | 0.003 | 0.015 | 0.0028 | 0.04 | 0.18 | 0.28 | 0.10 |
| | A11 | 0.36 | 0.43 | 0.70 | 0.009 | 0.0012 | 0.004 | 0.075 | 0.0026 | 0.03 | 0.18 | 0.30 | 0.13 |
| | A12 | 0.30 | 0.40 | 0.76 | 0.008 | 0.0014 | 0.005 | 0.035 | 0.0008 | 0.05 | 0.24 | 0.27 | 0.11 |
| | A13 | 0.30 | 0.38 | 0.63 | 0.011 | 0.0008 | 0.006 | 0.040 | 0.0070 | 0.04 | 0.27 | 0.40 | 0.15 |
| | A14 | 0.34 | 0.40 | 0.62 | 0.010 | 0.0016 | 0.005 | 0.041 | 0.0024 | 0.03 | 0.22 | 0.33 | 0.14 |
| | A15 | 0.33 | 0.36 | 0.80 | 0.013 | 0.0020 | 0.004 | 0.038 | 0.0020 | 0.08 | 0.23 | 0.23 | 0.10 |
| | A16 | 0.43 | 0.40 | 0.55 | 0.012 | 0.0021 | 0.005 | 0.036 | 0.0023 | 0.03 | 0.15 | 0.26 | 0.12 |
| | A17 | 0.29 | 0.30 | 0.40 | 0.009 | 0.0017 | 0.006 | 0.043 | 0.0023 | 0.03 | 0.70 | 0.33 | 0.13 |
| | A18 | 0.30 | 0.47 | 0.65 | 0.010 | 0.0017 | 0.004 | 0.040 | 0.0022 | 0.04 | 0.22 | 0.18 | 0.09 |
| | A19 | 0.42 | 0.37 | 0.56 | 0.010 | 0.0014 | 0.004 | 0.038 | 0.0021 | 0.05 | 0.24 | 0.90 | 0.18 |
| | A20 | 0.45 | 0.48 | 0.58 | 0.011 | 0.0010 | 0.003 | 0.029 | 0.0020 | 0.05 | 0.22 | 0.26 | 0.08 |
| | A21 | 0.31 | 0.36 | 0.62 | 0.009 | 0.0010 | 0.004 | 0.035 | 0.0020 | 0.04 | 0.24 | 0.29 | 0.22 |
| | A22 | 0.30 | 0.40 | 0.80 | 0.009 | 0.0005 | 0.004 | 0.035 | 0.0025 | 0.05 | 0.21 | 0.25 | 0.16 |
| | A23 | 0.35 | 0.45 | 0.60 | 0.008 | 0.0005 | 0.004 | 0.033 | 0.0024 | 0.04 | 0.20 | 0.24 | 0.18 |
| | A24 | 0.50 | 0.50 | 0.40 | 0.009 | 0.0006 | 0.004 | 0.034 | 0.0023 | 0.03 | 0.22 | 0.26 | 0.18 |

| | Steel No. | Chemical composition (mass %) and remainder consisting of Fe and impurities | | | | | | | | | Transformation point (° C.) | | Upper critical cooling rate (° C./s) |
|---|---|---|---|---|---|---|---|---|---|---|---|---|---|
| | | Cr | V | Ca | Al | Sn | W | Sb | Zr | REM | Ac3 | Ms | |
| Invention Example | A1 | | | | | | | | | | 841 | 402 | 20 |
| | A2 | | | | | | | | | | 778 | 306 | 30 |
| | A3 | 0.20 | | 0.002 | | | | | | | 802 | 373 | 20 |
| | A4 | | | | 0.04 | | | | | 0.10 | 851 | 382 | 20 |
| | A5 | 0.10 | | | | 0.05 | | | 0.12 | | 806 | 365 | 30 |
| | A6 | | 0.23 | | | | 0.20 | | | | 837 | 397 | 20 |
| | A7 | | | | 0.03 | | | 0.07 | | | 850 | 410 | 30 |
| | A8 | | 0.20 | | | | | | | | 845 | 406 | 30 |
| | A9 | 0.15 | | | | | | | | | 831 | 401 | 20 |
| | A10 | | | | | | | | | 0.10 | 804 | 395 | 30 |
| | A11 | | | | | | | | | | 826 | 369 | 20 |
| | A12 | | | 0.003 | | | | | 0.08 | | 821 | 391 | 30 |
| | A13 | | | | 0.08 | | | | | | 827 | 391 | 10 |
| | A14 | | | | | | 0.15 | | | | 821 | 382 | 20 |
| | A15 | 0.34 | | | | | | | | | 812 | 374 | 20 |
| | A16 | | | | | | | 0.08 | | | 803 | 347 | 30 |
| | A17 | | | | | | | | | | 843 | 406 | 10 |
| | A18 | | | | | | | | | 0.20 | 831 | 396 | 20 |
| | A19 | | 0.15 | | | | | | | | 813 | 340 | 10 |
| | A20 | | | | | | | | | | 804 | 339 | 20 |
| | A21 | | | | 0.03 | | 0.20 | | | | 828 | 390 | 20 |
| | A22 | 0.11 | | | 0.04 | | | | | | 825 | 385 | 20 |
| | A23 | 0.09 | | | 0.04 | 0.05 | | | | | 823 | 379 | 20 |
| | A24 | 0.10 | | | 0.04 | | 0.30 | | | | 806 | 319 | 20 |

TABLE 1B

| | Steel No. | Chemical composition (mass %) and remainder consisting of Fe and impurities | | | | | | | | | | | |
|---|---|---|---|---|---|---|---|---|---|---|---|---|---|
| | | C | Si | Mn | P | S | N | Ti | B | Nb | Mo | Cu | Ni |
| Comparative Example | a1 | 0.20 | 0.30 | 0.60 | 0.009 | 0.0010 | 0.004 | 0.034 | 0.0023 | 0.04 | 0.15 | 0.21 | 0.19 |
| | a2 | 0.80 | 0.40 | 0.77 | 0.010 | 0.0013 | 0.003 | 0.035 | 0.0023 | 0.05 | 0.21 | 0.20 | 0.18 |
| | a3 | 0.29 | 0.01 | 0.45 | 0.012 | 0.0012 | 0.005 | 0.038 | 0.0022 | 0.06 | 0.16 | 0.23 | 0.12 |
| | a4 | 0.30 | 2.20 | 0.50 | 0.015 | 0.0020 | 0.004 | 0.037 | 0.0028 | 0.05 | 0.20 | 0.22 | 0.18 |
| | a5 | 0.32 | 0.25 | 0.05 | 0.013 | 0.0018 | 0.004 | 0.035 | 0.0023 | 0.04 | 0.14 | 0.20 | 0.11 |
| | a6 | 0.40 | 0.55 | 2.20 | 0.014 | 0.0018 | 0.003 | 0.037 | 0.0027 | 0.04 | 0.23 | 0.21 | 0.16 |
| | a7 | 0.36 | 0.60 | 0.89 | 0.100 | 0.0007 | 0.004 | 0.038 | 0.0024 | 0.03 | 0.28 | 0.20 | 0.17 |
| | a8 | 0.37 | 0.63 | 0.86 | 0.018 | 0.0500 | 0.005 | 0.032 | 0.0025 | 0.04 | 0.23 | 0.19 | 0.18 |
| | a9 | 0.42 | 0.55 | 0.92 | 0.010 | 0.0018 | 0.100 | 0.033 | 0.0025 | 0.05 | 0.20 | 0.19 | 0.17 |
| | a10 | 0.41 | 0.57 | 0.76 | 0.012 | 0.0012 | 0.004 | 0.002 | 0.0022 | 0.04 | 0.22 | 0.20 | 0.19 |
| | a11 | 0.30 | 0.23 | 0.90 | 0.011 | 0.0018 | 0.005 | 0.300 | 0.0023 | 0.04 | 0.15 | 0.20 | 0.10 |
| | a12 | 0.38 | 0.82 | 0.88 | 0.013 | 0.0012 | 0.004 | 0.034 | 0.0002 | 0.04 | 0.21 | 0.22 | 0.18 |
| | a13 | 0.36 | 0.66 | 0.80 | 0.010 | 0.0013 | 0.004 | 0.033 | 0.0320 | 0.04 | 0.21 | 0.21 | 0.18 |
| | a14 | 0.39 | 0.44 | 0.76 | 0.017 | 0.0015 | 0.004 | 0.038 | 0.0025 | 0.01 | 0.18 | 0.22 | 0.17 |
| | a15 | 0.42 | 0.33 | 0.72 | 0.015 | 0.0011 | 0.004 | 0.037 | 0.0029 | 0.60 | 0.22 | 0.20 | 0.17 |

TABLE 1B-continued

| | | | | | | | | | | | | |
|---|---|---|---|---|---|---|---|---|---|---|---|---|
| a16 | 0.33 | 0.30 | 0.50 | 0.014 | 0.0011 | 0.004 | 0.033 | 0.0028 | 0.05 | 0.02 | 0.21 | 0.10 |
| a17 | 0.38 | 0.50 | 0.68 | 0.017 | 0.0016 | 0.005 | 0.031 | 0.0027 | 0.03 | 2.00 | 0.20 | 0.19 |
| a18 | 0.32 | 0.30 | 0.67 | 0.013 | 0.0014 | 0.004 | 0.031 | 0.0023 | 0.05 | 0.24 | 0.02 | 0.18 |
| a19 | 0.34 | 0.60 | 0.60 | 0.015 | 0.0020 | 0.004 | 0.030 | 0.0025 | 0.04 | 0.20 | 0.23 | 0.60 |
| a20 | 0.34 | 0.60 | 0.60 | 0.015 | 0.0020 | 0.004 | 0.030 | 0.0025 | 0.04 | 0.20 | 0.01 | 0.40 |

| | Steel No. | Chemical composition (mass %) and remainder consisting of Fe and impurities | | | | | | | | Transformation point (° C.) | | Upper critical cooling rate (° C./s) |
|---|---|---|---|---|---|---|---|---|---|---|---|---|
| | | Cr | V | Ca | Al | Sn | W | Sb | Zr | REM | Ac3 | Ms | |
| Comparative Example | a1 | | | | | | | | | | 840 | 437 | 30 |
| | a2 | | | | | | | | | | 750 | 185 | 10 |
| | a3 | | | | | | | | | | 805 | 415 | 80 |
| | a4 | | | | 0.08 | | | | | | 957 | 389 | 20 |
| | a5 | | | | | | | | | 0.10 | 830 | 414 | 80 |
| | a6 | | | | | 0.20 | | | | | 779 | 293 | 10 |
| | a7 | | | | | | | 0.18 | | | 890 | 365 | 20 |
| | a8 | | | | | | | | 0.17 | | 829 | 359 | 20 |
| | a9 | | 0.21 | | | | | | | | 829 | 335 | 20 |
| | a10 | | | | 0.05 | | | | | | 804 | 349 | 20 |
| | a11 | | | 0.002 | | | 0.18 | | | | 918 | 389 | 30 |
| | a12 | 0.40 | | | | | 0.13 | | | | 830 | 341 | 40 |
| | a13 | | | | | | | | 0.22 | | 829 | 365 | 20 |
| | a14 | | 0.21 | | | 0.05 | | | | | 836 | 358 | 20 |
| | a15 | | | | | | | | 0.16 | 0.05 | 800 | 343 | 10 |
| | a16 | | | | 0.05 | | 0.15 | | | | 823 | 395 | 80 |
| | a17 | 0.34 | 0.20 | | | | | | | | 898 | 344 | 10 |
| | a18 | 0.42 | | | 0.03 | | | | | | 818 | 385 | 20 |
| | a19 | | | | | | | | | | 827 | 373 | 20 |
| | a20 | 0.40 | | 0.005 | 0.04 | | | | | | 835 | 373 | 20 |

Example 1

The obtained slabs were hot-rolled and coiled at a temperature of 800° C. or lower to obtain a hot-rolled steel sheets each having a thickness of 2.7 mm. S31, S32, and S33 of the obtained hot-rolled steel sheets remained hot-rolled and were not subjected to hot-rolled sheet annealing, cold rolling, or annealing. Furthermore, S28, S29, and S30 were subjected to hot-rolled sheet annealing under conditions where the heating temperature was 700° C. and the retention time was 12 hours, but were not subjected to cold rolling and annealing.

As for S25, S26, and S27, cold rolling was performed on the hot-rolled steel sheets after hot rolling to obtain cold-rolled steel sheets each having a thickness of 1.6 mm. No annealing was performed on the cold-rolled steel sheets.

Cold rolling was performed on the hot-rolled steel sheets after hot rolling other than the above hot-rolled steel sheets, to obtain cold-rolled steel sheets each having a thickness of 1.0 to 1.6 mm, and annealing was performed on the cold-rolled steel sheets under a condition of a heating temperature of 750° C.

Al plating was applied to the obtained hot-rolled steel sheets, cold-rolled steel sheets, and annealed steel sheets to obtain coated steel sheets each having an Al-based coating. In a plating step, after the steel sheets were immersed in an Al plating bath at 680° C. containing 10 mass % of Si and 2 mass % of Fe and containing a remainder consisting of Al and impurities, the steel sheets were cooled to temperatures shown in Tables 2A and 2B at average cooling rates shown in Tables 2A and 2B and were coiled. As for S34 to S39, the Al-based coated steel sheets after Al plating were annealed at the temperatures shown in Tables 2A and 2B for a retention time of 240 seconds as a post-heat treatment. As for S34, temper rolling was further performed at a rolling reduction of 0.2% to adjust the shape.

Chemical compositions of the coated steel sheets at a ¼ thickness position from the surface of each of the steel sheets in the sheet thickness direction were the same as chemical compositions of the slabs.

Furthermore, a thickness of the coating was 25 to 35 μm.

<Maximum Cu Content of Boundary Portion between Steel Sheet and Coating>

The obtained coated steel sheets were cut out, and GDS was performed from the surface of each of the coated steel sheets in the sheet thickness direction to investigate the Cu content and Fe content. Measurement by GDS was performed at five random points at a ¼ width position (short side) from a width direction end portion of each of the coated steel members. As a result of the measurement, a region where the Fe content was 85 mass % or more and less than 95 mass % was determined to be a boundary portion, and the maximum Cu content of the boundary portion was obtained. The measurement was performed five times, and the average value of the measured maximum Cu contents was used as the maximum Cu content of the boundary between the steel sheet and the coating. Furthermore, the ratio between the maximum Cu content of the boundary portion and the Cu content of the steel sheet (Cu ratio of the boundary portion) was calculated.

The evaluation results are shown in Tables 2A and 2B.

TABLE 2A

| | | | Average cooling rate (° C./s) | Cooling stop temperature (° C.) | Reheating (° C.) | Coated steel sheet | | Sheet thickness (mm) |
| | Reference symbol | Steel No. | | | | Maximum Cu content of boundary portion (mass %) | Cu content ratio of boundary portion (mass %) | |
|---|---|---|---|---|---|---|---|---|
| Invention Example | S1 | A1 | 14 | ≤200 | — | 0.27 | 104 | 1.6 |
| | S2 | A2 | 14 | ≤200 | — | 0.31 | 103 | 1.6 |
| | S3 | A3 | 14 | ≤200 | — | 0.25 | 100 | 1.6 |
| | S4 | A4 | 14 | ≤200 | — | 0.27 | 104 | 1.6 |
| | S5 | A5 | 14 | ≤200 | — | 0.30 | 107 | 1.6 |
| | S6 | A6 | 14 | ≤200 | — | 0.34 | 106 | 1.6 |
| | S7 | A7 | 14 | ≤200 | — | 0.24 | 104 | 1.6 |
| | S8 | A8 | 14 | ≤200 | — | 0.27 | 108 | 1.6 |
| | S9 | A9 | 14 | ≤200 | — | 0.25 | 104 | 1.6 |
| | S10 | A10 | 14 | ≤200 | — | 0.30 | 107 | 1.6 |
| | S11 | A11 | 14 | ≤200 | — | 0.32 | 107 | 1.6 |
| | S12 | A12 | 14 | ≤200 | — | 0.28 | 104 | 1.6 |
| | S13 | A13 | 14 | ≤200 | — | 0.42 | 105 | 1.6 |
| | S14 | A14 | 14 | ≤200 | — | 0.35 | 106 | 1.6 |
| | S15 | A15 | 14 | ≤200 | — | 0.24 | 104 | 1.6 |
| | S16 | A16 | 14 | ≤200 | — | 0.28 | 108 | 1.6 |
| | S17 | A17 | 14 | ≤200 | — | 0.35 | 106 | 1.6 |
| | S18 | A18 | 14 | ≤200 | — | 0.17 | 94 | 1.6 |
| | S19 | A19 | 14 | ≤200 | — | 1.10 | 122 | 1.6 |
| | S20 | A20 | 14 | ≤200 | — | 0.27 | 104 | 1.6 |
| | S21 | A21 | 14 | ≤200 | — | 0.30 | 103 | 1.6 |
| | S22 | A22 | 14 | ≤200 | — | 0.26 | 104 | 1.6 |
| | S23 | A23 | 14 | ≤200 | — | 0.27 | 113 | 1.6 |
| | S24 | A24 | 14 | ≤200 | — | 0.29 | 112 | 1.6 |
| | S25 | A22 | 20 | ≤200 | — | 0.25 | 100 | 1.6 |
| | S26 | A23 | 20 | ≤200 | — | 0.24 | 100 | 1.6 |
| | S27 | A24 | 20 | ≤200 | — | 0.25 | 96 | 1.6 |
| | S28 | A22 | 6 | ≤200 | — | 0.30 | 120 | 2.7 |
| | S29 | A23 | 6 | ≤200 | — | 0.29 | 121 | 2.7 |
| | S30 | A24 | 6 | ≤200 | — | 0.32 | 123 | 2.7 |
| | S31 | A22 | 8 | ≤200 | — | 0.28 | 112 | 2.7 |
| | S32 | A23 | 8 | ≤200 | — | 0.29 | 121 | 2.7 |
| | S33 | A24 | 8 | ≤200 | — | 0.30 | 115 | 2.7 |
| | S34 | A22 | 14 | ≤200 | 700 | 0.32 | 128 | 1.6 |
| | S35 | A23 | 14 | ≤200 | 700 | 0.31 | 129 | 1.6 |
| | S36 | A24 | 14 | ≤200 | 700 | 0.33 | 127 | 1.6 |
| | S37 | A22 | 14 | ≤200 | 540 | 0.31 | 124 | 1.6 |
| | S38 | A 23 | 14 | ≤200 | 540 | 0.30 | 125 | 1.6 |
| | S39 | A24 | 14 | ≤200 | 540 | 0.32 | 123 | 1.6 |

TABLE 2B

| | | | Average cooling rate (° C./s) | Cooling stop temperature (° C.) | Re-heating (° C.) | Coated steel sheet | | Sheet thickness (mm) |
| | Reference symbol | Steel No. | | | | Maximum Cu content of boundary portion (mass %) | Cu content ratio of boundary portion (mass %) | |
|---|---|---|---|---|---|---|---|---|
| Comparative Example | s1 | a1 | 14 | ≤200 | — | 0.22 | 105 | 1.6 |
| | s2 | a2 | 14 | ≤200 | — | 0.21 | 105 | 1.6 |
| | s3 | a3 | 14 | ≤200 | — | 0.24 | 104 | 1.6 |
| | s4 | a4 | 14 | ≤200 | — | 0.23 | 105 | 1.6 |
| | s5 | a5 | 14 | ≤200 | — | 0.21 | 105 | 1.6 |
| | s6 | a6 | 14 | ≤200 | — | 0.21 | 100 | 1.6 |
| | s7 | a7 | 14 | ≤200 | — | 0.20 | 100 | 1.6 |
| | s8 | a8 | 14 | ≤200 | — | 0.19 | 100 | 1.6 |
| | s9 | a9 | 14 | ≤200 | — | 0.20 | 105 | 1.6 |
| | s10 | a10 | 14 | ≤200 | — | 0.20 | 100 | 1.6 |
| | s11 | a11 | 14 | ≤200 | — | 0.21 | 105 | 1.6 |
| | s12 | a12 | 14 | ≤200 | — | 0.24 | 109 | 1.6 |
| | s13 | a13 | 14 | ≤200 | — | 0.22 | 105 | 1.6 |
| | s14 | a14 | 14 | ≤200 | — | 0.24 | 109 | 1.6 |
| | s15 | a15 | 14 | ≤200 | — | 0.21 | 105 | 1.6 |
| | s16 | a16 | 14 | ≤200 | — | 0.22 | 105 | 1.6 |
| | s17 | a17 | 14 | ≤200 | — | 0.20 | 100 | 1.6 |
| | s18 | a18 | 14 | ≤200 | — | 0.01 | 50 | 1.6 |
| | s19 | a19 | 14 | ≤200 | — | 0.24 | 104 | 1.6 |
| | s20 | a20 | 14 | ≤200 | — | 0.00 | 0 | 1.6 |

TABLE 2B-continued

| | | | | | Coated steel sheet | | |
| --- | --- | --- | --- | --- | --- | --- | --- |
| Reference symbol | Steel No. | Average cooling rate (° C./s) | Cooling stop temperature (° C.) | Re-heating (° C.) | Maximum Cu content of boundary portion (mass %) | Cu content ratio of boundary portion (mass %) | Sheet thickness (mm) |
| s21 | A22 | 20 | 500 | — | 0.15 | 60 | 1.0 |
| s22 | A23 | 20 | 500 | — | 0.14 | 58 | 1.0 |
| s23 | A24 | 20 | 500 | — | 0.15 | 58 | 1.0 |
| s24 | A22 | 80 | ≤200 | — | 0.12 | 48 | 1.6 |
| s25 | A23 | 80 | ≤200 | — | 0.12 | 50 | 1.6 |
| s26 | A24 | 80 | ≤200 | — | 0.11 | 42 | 1.6 |
| s27 | a1 | 60 | ≤200 | — | 0.12 | 57 | 1.6 |
| s28 | a2 | 60 | ≤200 | — | 0.10 | 50 | 1.6 |
| s29 | a3 | 60 | ≤200 | — | 0.11 | 48 | 1.6 |
| s30 | a4 | 60 | ≤200 | — | 0.12 | 55 | 1.6 |
| s31 | a5 | 60 | ≤200 | — | 0.12 | 60 | 1.6 |
| s32 | a6 | 60 | ≤200 | — | 0.11 | 52 | 1.6 |
| s33 | a7 | 60 | ≤200 | — | 0.10 | 50 | 1.6 |
| s34 | a8 | 60 | ≤200 | — | 0.12 | 63 | 1.6 |
| s35 | a9 | 60 | ≤200 | — | 0.12 | 63 | 1.6 |
| s36 | a10 | 60 | ≤200 | — | 0.11 | 55 | 1.6 |
| s37 | a11 | 60 | ≤200 | — | 0.09 | 45 | 1.6 |
| s38 | a12 | 60 | ≤200 | — | 0.10 | 45 | 1.6 |
| s39 | a13 | 60 | ≤200 | — | 0.12 | 57 | 1.6 |
| s40 | a14 | 60 | ≤200 | — | 0.08 | 36 | 1.6 |
| s41 | a15 | 60 | ≤200 | — | 0.09 | 45 | 1.6 |
| s42 | a16 | 60 | ≤200 | — | 0.10 | 48 | 1.6 |
| s43 | a17 | 60 | ≤200 | — | 0.09 | 45 | 1.6 |
| s44 | a18 | 60 | ≤200 | — | 0.00 | 0 | 1.6 |
| s45 | a19 | 60 | ≤200 | — | 0.12 | 52 | 1.6 |
| s46 | a20 | 60 | ≤200 | — | 0.00 | 0 | 1.6 |

As shown in Tables 2A and 2B, in Invention Examples Si to S39 that satisfied the scope of the present invention, the coated steel sheets each having a predetermined chemical composition and a structure were obtained. On the other hand, Comparative Examples s1 to s46 that did not satisfy the scope of the present invention did not satisfy at least one of the chemical composition and the Cu ratio of the boundary portion.

Example 2

Among the coated steel sheets produced in Example 1, the coated steel sheets in which the boundary portions had maximum Cu contents and Cu content ratios shown in Tables 3A and 3B were subjected to a heat treatment in the coated steel sheets were heated at dew points, temperature rising rates, and heating temperatures shown in Tables 3A and 3B, retained in a range of the heating temperatures±10° C. for 60 seconds, and were cooled to the Ms point or lower at average cooling rates shown in Tables 3A and 3B, to obtain coated steel members each having a flat sheet shape.

Chemical compositions of the coated steel members at a ¼ thickness position from a surface of each of steel sheet substrates in the sheet thickness direction were the same as the chemical compositions of the slabs.

In Invention Examples, martensite occupied 80 area % or more in a metallographic structure of each of the coated steel members. On the other hand, as for m3, m4, m5 and m16, martensite occupied less than 80 area %.

Furthermore, a thickness of the coating was 25 to 35 μm.

The obtained coated steel members were cut out, and glow discharge emission analysis (GDS), a tensile test, and a temperature-raising hydrogen analysis test were performed thereon by the following methods to evaluate the maximum Cu content, the tensile strength, the invading hydrogen amount (He) in a range of 5.0 μm from the surface. The evaluation results are shown in Tables 3A and 3B.

<Maximum Cu Content in Range from Surface to Depth of 5.0 μm>

GDS was performed from the surface of each of the coated steel members in the sheet thickness direction to investigate the Cu content. Measurement by GDS was performed at five random points at a ¼ width position (short side) from a width direction end portion of each of the coated steel members. As a result of the measurement, the maximum Cu content in the range from the surface of each of the coated steel members to a depth of 5.0 μm was obtained. The measurement was performed five times, and the average value of the measured maximum Cu contents was used as the maximum Cu content. Furthermore, the ratio between the maximum Cu content in the range from the surface to a depth of 5.0 μm and the Cu content of each of the steel sheet substrates (Cu concentration ratio (%)) was also calculated.

<Tensile Strength>

A tensile test was performed in accordance with ASTM Standard E8. After a soaked portion (portion separated from an end portion by 50 mm or more) of each of the coated steel members is grinded to a thickness of 1.2 mm, a half-sized sheet-shaped test piece of ASTM standard E8 (parallel portion length: 32 mm, parallel portion sheet width: 6.25 mm) was collected such that a test direction was parallel to a rolling direction. Then, a room temperature tensile test was performed at a strain rate of 3 mm/min to measure a tensile strength (maximum strength). In this example, a case where the tensile strength is more than 1,500 MPa was evaluated as having excellent strength.

<Invading Hydrogen Amount (He)>

Temperature-raising hydrogen analysis was performed on each of the coated steel members to measure an invading hydrogen amount. After the heat treatment, each of the coated steel members was cooled to −10° C. or lower and frozen, and the invading hydrogen amount (He) of each of the coated steel members was evaluated using the amount of diffusible hydrogen released when the temperature was raised to 300° C. at 100° C./hr in temperature-raising hydrogen analysis.

<Critical Hydrogen Amount Hc>

A strip-shaped test piece for U bending having a size of 100 mm×30 mm was collected from each of the coated steel sheets used as the material of the coated steel member having a flat sheet shape, and was processed into a U shape while being heated and cooled in a U-bending die under the same heat treatment conditions as the heat treatment conditions to which the coated steel members each having a flat sheet shape was subjected, and stress was applied to the test piece formed in a U shape to investigate the critical hydrogen amount where no cracking occurred. Specifically, after a stress of 0.6×TS was applied to the U-shaped test piece, the U-shaped test piece was left in a room temperature environment and was observed for cracks for up to one week. The critical hydrogen amount (Hc) of each of the coated steel members was obtained from the highest dew point where no cracking occurred, that is, the maximum hydrogen amount. The evaluation results are shown in Tables 3A and 3B.

In this example, Hc was 0.30 ppm or more when the tensile strength was less than 2.1 GPa, Hc was 0.25 ppm or more when the tensile strength was 2.1 GPa or more and less than 2.5 GPa, and Hc was 0.20 ppm or more when the tensile strength was 2.5 GPa or more. Further, when the invading hydrogen amount He was less than 0.30 ppm and less than the critical hydrogen amount Hc, the hydrogen embrittlement resistance was evaluated as being excellent.

TABLE 3A

| | | | Coated steel sheet | | | Heat treatment | | | | Coated steel member | | | | |
|---|---|---|---|---|---|---|---|---|---|---|---|---|---|---|
| | Reference symbol | Steel No. | Maximum Cu content of boundary portion (mass %) | Cu content ratio of boundary portion (mass %) | Sheet thickness (mm) | Dew point (° C.) | Temperature rising rate (° C./s) | Heating temperature (° C.) | Cooling rate to Ms (° C./s) | Maximum Cu content of surface layer (mass %) | Cu concentration ratio % | Tensile strength (MPa) | He (ppm) | Hc (ppm) |
| Invention Example | M1 | A1 | 0.27 | 104 | 1.6 | 0 | 3 | 920 | 50 | 0.65 | 250 | 1808 | 0.25 | 0.39 |
| | M2 | A2 | 0.31 | 103 | 1.6 | 0 | 3 | 920 | 50 | 0.62 | 207 | 2843 | 0.22 | 0.24 |
| | M3 | A3 | 0.25 | 100 | 1.6 | 0 | 3 | 920 | 50 | 0.59 | 236 | 2159 | 0.23 | 0.31 |
| | M4 | A4 | 0.27 | 104 | 1.6 | 0 | 3 | 920 | 50 | 0.62 | 238 | 2040 | 0.22 | 0.33 |
| | M5 | A5 | 0.30 | 107 | 1.6 | 0 | 3 | 920 | 50 | 0.65 | 232 | 2302 | 0.23 | 0.29 |
| | M6 | A6 | 0.34 | 106 | 1.6 | 0 | 3 | 920 | 50 | 0.70 | 219 | 1849 | 0.23 | 0.34 |
| | M7 | A7 | 0.24 | 104 | 1.6 | 0 | 3 | 920 | 50 | 0.54 | 235 | 1810 | 0.24 | 0.33 |
| | M8 | A8 | 0.27 | 108 | 1.6 | 0 | 3 | 920 | 50 | 0.60 | 240 | 1814 | 0.25 | 0.34 |
| | M9 | A9 | 0.25 | 104 | 1.6 | 0 | 3 | 920 | 50 | 0.59 | 246 | 1858 | 0.24 | 0.33 |
| | M10 | A10 | 0.30 | 107 | 1.6 | 0 | 3 | 920 | 50 | 0.58 | 207 | 1921 | 0.24 | 0.33 |
| | M11 | A11 | 0.32 | 107 | 1.6 | 0 | 3 | 920 | 50 | 0.70 | 233 | 2174 | 0.25 | 0.31 |
| | M12 | A12 | 0.28 | 104 | 1.6 | 0 | 3 | 920 | 50 | 0.63 | 233 | 1920 | 0.25 | 0.33 |
| | M13 | A13 | 0.42 | 105 | 1.6 | 0 | 3 | 920 | 50 | 1.02 | 255 | 1904 | 0.18 | 0.33 |
| | M14 | A14 | 0.35 | 106 | 1.6 | 0 | 3 | 920 | 50 | 0.79 | 239 | 2078 | 0.21 | 0.32 |
| | M15 | A15 | 0.24 | 104 | 1.6 | 0 | 3 | 920 | 50 | 0.46 | 200 | 2055 | 0.26 | 0.32 |
| | M16 | A16 | 0.28 | 108 | 1.6 | 0 | 3 | 920 | 50 | 0.65 | 250 | 2454 | 0.23 | 0.27 |
| | M17 | A17 | 0.35 | 106 | 1.6 | 0 | 3 | 920 | 50 | 0.87 | 264 | 1835 | 0.22 | 0.38 |
| | M18 | A18 | 0.17 | 94 | 1.6 | 0 | 3 | 920 | 50 | 0.33 | 183 | 1916 | 0.28 | 0.36 |
| | M19 | A19 | 1.10 | 122 | 1.6 | 0 | 3 | 920 | 50 | 1.98 | 220 | 2413 | 0.10 | 0.27 |
| | M20 | A20 | 0.27 | 104 | 1.6 | 0 | 3 | 920 | 50 | 0.56 | 215 | 2548 | 0.23 | 0.25 |
| | M21 | A21 | 0.30 | 103 | 1.6 | 0 | 3 | 920 | 50 | 0.69 | 238 | 1948 | 0.22 | 0.32 |
| | M22 | A22 | 0.26 | 104 | 1.6 | 0 | 3 | 920 | 50 | 0.57 | 228 | 1923 | 0.25 | 0.40 |
| | M23 | A23 | 0.27 | 113 | 1.6 | 0 | 3 | 920 | 50 | 0.58 | 242 | 2119 | 0.25 | 0.36 |
| | M24 | A24 | 0.29 | 112 | 1.6 | 0 | 3 | 920 | 50 | 0.60 | 231 | 2744 | 0.24 | 0.27 |
| | M25 | A22 | 0.26 | 104 | 1.6 | 5 | 10 | 900 | 30 | 0.58 | 232 | 1922 | 0.27 | 0.40 |
| | M26 | A23 | 0.27 | 113 | 1.6 | 5 | 10 | 900 | 30 | 0.60 | 250 | 2121 | 0.27 | 0.36 |
| | M27 | A24 | 0.29 | 112 | 1.6 | 5 | 10 | 900 | 30 | 0.61 | 235 | 2741 | 0.25 | 0.27 |
| | M28 | A22 | 0.26 | 104 | 1.6 | −5 | 10 | 920 | 50 | 0.55 | 220 | 1923 | 0.24 | 0.40 |
| | M29 | A23 | 0.27 | 113 | 1.6 | −5 | 10 | 920 | 50 | 0.56 | 233 | 2120 | 0.23 | 0.36 |
| | M30 | A24 | 0.29 | 112 | 1.6 | −5 | 10 | 920 | 50 | 0.57 | 219 | 2744 | 0.22 | 0.27 |
| | M31 | A22 | 0.26 | 104 | 1.6 | −30 | 10 | 920 | 30 | 0.44 | 176 | 1925 | 0.17 | 0.40 |
| | M32 | A23 | 0.27 | 113 | 1.6 | −30 | 10 | 920 | 30 | 0.42 | 175 | 2125 | 0.18 | 0.36 |
| | M33 | A24 | 0.29 | 112 | 1.6 | −30 | 10 | 920 | 30 | 0.45 | 173 | 2745 | 0.22 | 0.27 |
| | M34 | A22 | 0.30 | 120 | 2.7 | 0 | 2 | 920 | 30 | 0.62 | 248 | 1930 | 0.22 | 0.40 |
| | M35 | A23 | 0.29 | 121 | 2.7 | 0 | 2 | 920 | 30 | 0.60 | 250 | 2130 | 0.23 | 0.35 |
| | M36 | A24 | 0.32 | 123 | 2.7 | 0 | 2 | 920 | 30 | 0.65 | 250 | 2748 | 0.22 | 0.26 |
| | M37 | A22 | 0.32 | 128 | 1.6 | 0 | 3 | 920 | 50 | 0.65 | 260 | 1923 | 0.19 | 0.40 |
| | M38 | A23 | 0.31 | 129 | 1.6 | 0 | 3 | 920 | 50 | 0.64 | 267 | 2119 | 0.18 | 0.36 |
| | M39 | A24 | 0.33 | 127 | 1.6 | 0 | 3 | 920 | 50 | 0.67 | 258 | 2744 | 0.19 | 0.27 |
| | M40 | A22 | 0.31 | 124 | 1.6 | 0 | 3 | 920 | 50 | 0.63 | 252 | 1923 | 0.21 | 0.40 |
| | M41 | A23 | 0.30 | 125 | 1.6 | 0 | 3 | 920 | 50 | 0.63 | 263 | 2119 | 0.20 | 0.36 |
| | M42 | A24 | 0.32 | 123 | 1.6 | 0 | 3 | 920 | 50 | 0.65 | 250 | 2744 | 0.21 | 0.27 |

TABLE 3B

| | | | Coated steel sheet | | | Heat treatment | | | Coated steel member | | | | |
|---|---|---|---|---|---|---|---|---|---|---|---|---|---|
| | Reference symbol | Steel No. | Maximum Cu content of boundary portion (mass %) | Cu content ratio of boundary portion (mass %) | Sheet thickness (mm) | Dew point (° C.) | Temperature rising rate (° C./s) | Heating temperature (° C.) | Cooling rate to Ms (° C./s) | Maximum Cu content of surface layer (mass %) | Cu concentration ratio % | Tensile strength (MPa) | He (ppm) | Hc (ppm) |
| Comparative Example | m1 | a1 | 0.12 | 57 | 1.6 | 0 | 3 | 920 | 50 | 0.49 | 233 | 1472 | 0.27 | 0.55 |
| | m2 | a2 | 0.10 | 50 | 1.6 | 0 | 3 | 920 | 50 | 0.48 | 240 | 2669 | 0.28 | 0.08 |
| | m3 | a3 | 0.11 | 48 | 1.6 | 0 | 3 | 920 | 50 | 0.52 | 226 | 1234 | 0.27 | 0.72 |
| | m4 | a4 | 0.12 | 55 | 1.6 | 0 | 3 | 920 | 50 | 0.49 | 223 | 1431 | 0.28 | 0.59 |
| | m5 | a5 | 0.12 | 60 | 1.6 | 0 | 3 | 920 | 50 | 0.43 | 215 | 1226 | 0.28 | 0.70 |
| | m6 | a6 | 0.11 | 52 | 1.6 | 0 | 3 | 920 | 50 | 0.43 | 205 | 2508 | 0.28 | 0.16 |
| | m7 | a7 | 0.10 | 50 | 1.6 | 0 | 3 | 920 | 50 | 0.42 | 210 | 2197 | 0.28 | 0.22 |
| | m8 | a8 | 0.12 | 63 | 1.6 | 0 | 3 | 920 | 50 | 0.40 | 211 | 2235 | 0.28 | 0.21 |
| | m9 | a9 | 0.12 | 63 | 1.6 | 0 | 3 | 920 | 50 | 0.41 | 216 | 2452 | 0.27 | 0.17 |
| | m10 | a10 | 0.11 | 55 | 1.6 | 0 | 3 | 920 | 50 | 0.45 | 225 | 2399 | 0.28 | 0.19 |
| | m11 | a11 | 0.09 | 45 | 1.6 | 0 | 3 | 920 | 50 | 0.43 | 215 | 1437 | 0.27 | 0.54 |
| | m12 | a12 | 0.10 | 45 | 1.6 | 0 | 3 | 920 | 50 | 0.44 | 200 | 2285 | 0.27 | 0.20 |
| | m13 | a13 | 0.12 | 57 | 1.6 | 0 | 3 | 920 | 50 | 0.44 | 210 | 2190 | 0.28 | 0.20 |
| | m14 | a14 | 0.08 | 36 | 1.6 | 0 | 3 | 920 | 50 | 0.46 | 209 | 2306 | 0.27 | 0.18 |
| | m15 | a15 | 0.09 | 45 | 1.6 | 0 | 3 | 920 | 50 | 0.43 | 215 | 2426 | 0.27 | 0.16 |
| | m16 | a16 | 0.10 | 48 | 1.6 | 0 | 3 | 920 | 50 | 0.44 | 210 | 1316 | 0.28 | 0.64 |
| | m17 | a17 | 0.09 | 45 | 1.6 | 0 | 3 | 920 | 50 | 0.45 | 225 | 2256 | 0.28 | 0.19 |
| | m18 | a18 | 0.00 | 0 | 1.6 | 0 | 3 | 920 | 50 | 0.01 | 50 | 1996 | 0.46 | 0.33 |
| | m19 | a19 | 0.12 | 52 | 1.6 | 0 | 3 | 920 | 50 | 0.48 | 209 | 2077 | 0.28 | 0.23 |
| | m20 | a20 | 0.00 | 0 | 1.6 | 0 | 3 | 920 | 50 | 0.00 | 0 | 2077 | 0.42 | 0.24 |
| | m21 | A22 | 0.26 | 104 | 1.6 | 40 | 5 | 930 | 50 | 0.61 | 244 | 1905 | 0.47 | 0.40 |
| | m22 | A23 | 0.27 | 113 | 1.6 | 40 | 5 | 930 | 50 | 0.62 | 258 | 2110 | 0.47 | 0.37 |
| | m23 | A24 | 0.29 | 112 | 1.6 | 40 | 5 | 930 | 50 | 0.64 | 246 | 2709 | 0.45 | 0.28 |
| | m24 | a2 | 0.21 | 105 | 1.6 | 40 | 5 | 930 | 50 | 0.52 | 260 | 2651 | 0.48 | 0.08 |
| | m25 | a6 | 0.21 | 100 | 1.6 | 40 | 5 | 930 | 50 | 0.46 | 219 | 2501 | 0.47 | 0.16 |
| | m26 | a7 | 0.20 | 100 | 1.6 | 40 | 5 | 930 | 50 | 0.45 | 225 | 2190 | 0.46 | 0.22 |
| | m27 | a8 | 0.19 | 100 | 1.6 | 40 | 5 | 930 | 50 | 0.44 | 232 | 2231 | 0.48 | 0.21 |
| | m28 | a9 | 0.20 | 105 | 1.6 | 40 | 5 | 930 | 50 | 0.45 | 237 | 2446 | 0.46 | 0.17 |
| | m29 | a10 | 0.20 | 100 | 1.6 | 40 | 5 | 930 | 50 | 0.48 | 240 | 2392 | 0.48 | 0.19 |
| | m30 | a12 | 0.24 | 109 | 1.6 | 40 | 5 | 930 | 50 | 0.47 | 214 | 2280 | 0.47 | 0.20 |
| | m31 | a13 | 0.22 | 105 | 1.6 | 40 | 5 | 930 | 50 | 0.48 | 229 | 2179 | 0.46 | 0.20 |
| | m32 | a14 | 0.24 | 109 | 1.6 | 40 | 5 | 930 | 50 | 0.48 | 218 | 2299 | 0.47 | 0.18 |
| | m33 | a15 | 0.21 | 105 | 1.6 | 40 | 5 | 930 | 50 | 0.46 | 230 | 2410 | 0.46 | 0.16 |
| | m34 | a17 | 0.20 | 100 | 1.6 | 40 | 5 | 930 | 50 | 0.49 | 245 | 2240 | 0.47 | 0.19 |
| | m35 | a18 | 0.01 | 50 | 1.6 | 40 | 5 | 930 | 50 | 0.02 | 100 | 1990 | 0.64 | 0.33 |
| | m36 | a19 | 0.24 | 104 | 1.6 | 40 | 5 | 930 | 50 | 0.50 | 217 | 2069 | 0.48 | 0.23 |
| | m37 | a20 | 0.00 | 0 | 1.6 | 40 | 5 | 930 | 50 | 0.00 | 0 | 2070 | 0.62 | 0.24 |

As shown in Tables 3A and 3B, Invention Examples M1 to M42 that satisfied the scope of the present invention showed good results in terms of structure and properties, but in Comparative Examples m1 to m37 that did not satisfy the scope of the present invention, the chemical compositions or the concentration of Cu in the surface layer was insufficient, and at least one of strength and hydrogen embrittlement resistance was inferior.

INDUSTRIAL APPLICABILITY

According to the present invention, it is possible to obtain a coated steel member and a steel sheet having high strength and excellent hydrogen embrittlement resistance. The coated steel member according to the present invention is particularly suitable for use as a vehicle frame component. Since the steel member of the present invention has high strength and excellent hydrogen embrittlement resistance, the steel member contributes to improvement in fuel consumption and collision safety when being applied to a vehicle component.

BRIEF DESCRIPTION OF THE REFERENCE SYMBOLS

1 Steel sheet substrate
2 Coating containing Al and Fe (Al—Fe-based coating)
3 Cu concentration region
11 Steel sheet
12 Coating containing Al (Al-based coating)
13 Boundary portion

What is claimed is:
1. A coated steel sheet comprising:
a steel sheet containing, as a chemical composition, by mass %,
C: 0.25% to 0.65%,
Si: 0.10% to 1.00%,
Mn: 0.30% to 1.00%,
P: 0.050% or less,
S: 0.0100% or less,
N: 0.010% or less,
Ti: 0.010% to 0.100%,
B: 0.0005% to 0.0100%,
Nb: 0.02% to 0.10%,
Mo: 0.10% to 1.00%,
Cu: 0.15% to 1.00%,

Ni: 0.05% to 0.25%,
Cr: 0% to 1.00%,
V: 0% to 1.00%,
Ca: 0% to 0.010%,
Al: 0% to 1.00%,
Sn: 0% to 1.00%,
W: 0% to 1.00%,
Sb: 0% to 1.00%,
Zr: 0% to 1.00%,
REM: 0% to 0.30%, and
a remainder consisting of Fe and impurities;
a coating on a surface of the steel sheet and containing Al; and
a boundary portion formed between the steel sheet and the coating,
wherein a maximum Cu content of the boundary portion is 80% or more of an average Cu content of the steel sheet.

2. A method for producing a coated steel sheet, the method comprising:
melting and casting a steel containing, as a chemical composition, by mass %, C: 0.25% to 0.65%, Si: 0.10% to 1.00%, Mn: 0.30% to 1.00%, P: 0.050% or less, S: 0.0100% or less, N: 0.010% or less, Ti: 0.010% to 0.100%, B: 0.0005% to 0.0100%, Nb: 0.02% to 0.10%, Mo: 0.10% to 1.00%, Cu: 0.15% to 1.00%, Ni: 0.05% to 0.25%, Cr: 0% to 1.00%, V: 0% to 1.00%, Ca: 0% to 0.010%, Al: 0% to 1.00%, Sn: 0% to 1.00%, W: 0% to 1.00%, Sb: 0% to 1.00%, Zr: 0% to 1.00%, REM: 0% to 0.30%, and a remainder consisting of Fe and impurities, to obtain a slab;
hot-rolling the slab into a hot-rolled steel sheet;
coiling the hot-rolled steel sheet;
as necessary, annealing the hot-rolled steel sheet;
as necessary, descaling the hot-rolled steel sheet and cold-rolling the hot-rolled steel sheet into a cold-rolled steel sheet;
as necessary, annealing the hot-rolled steel sheet or the cold-rolled steel sheet into an annealed steel sheet; and
forming an Al-based coating by immersing the hot-rolled steel sheet, the cold-rolled steel sheet, or the annealed steel sheet in an Al-based plating bath having a bath temperature of 600° C. or higher, and then cooling the hot-rolled steel sheet, the cold-rolled steel sheet, or the annealed steel sheet to 200° C. or lower at an average cooling rate of slower than 30° C./s.

3. The method for producing a coated steel sheet according to claim 2, further comprising:
post-heating to anneal the coated steel sheet obtained by the forming of the Al-based coating, in a temperature range of 450° C. to 800° C.

* * * * *